United States Patent
Tashiro

(10) Patent No.: US 7,115,067 B2
(45) Date of Patent: Oct. 3, 2006

(54) METHOD AND APPARATUS FOR CONTROLLING JOINT FORCE OF FRICTION-JOINT COMPONENT MOUNTED ON VEHICLE

(75) Inventor: Tsutomu Tashiro, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/654,973

(22) Filed: Sep. 5, 2003

(65) Prior Publication Data

US 2004/0048718 A1    Mar. 11, 2004

(30) Foreign Application Priority Data

Sep. 5, 2002  (JP) .............................. 2002-260467

(51) Int. Cl.
*B60W 10/02* (2006.01)
*F16H 59/64* (2006.01)

(52) U.S. Cl. ........................... 477/83; 477/98; 477/906

(58) Field of Classification Search ................ 477/156, 477/159, 98, 174–6, 181, 70, 76, 83–4; 701/54
See application file for complete search history.

(56) References Cited

U.S. PATENT DOCUMENTS

| | | | | |
|---|---|---|---|---|
| 5,216,938 A | * | 6/1993 | Yamaguchi | 477/906 |
| 5,325,740 A | | 7/1994 | Zhang et al. | |
| 5,558,597 A | * | 9/1996 | Oba et al. | 477/98 |
| 5,766,110 A | * | 6/1998 | Kanno et al. | 477/175 |
| 5,803,869 A | * | 9/1998 | Jamzadeh et al. | 477/174 |
| 6,292,741 B1 | | 9/2001 | Bitzer et al. | |
| 6,364,811 B1 | * | 4/2002 | Hubbard et al. | 477/156 |
| 6,711,964 B1 | * | 3/2004 | Ochi et al. | 477/156 |
| 2001/0049576 A1 | * | 12/2001 | Wheeler et al. | 701/53 |
| 2004/0034460 A1 | * | 2/2004 | Folkerts et al. | 701/54 |

FOREIGN PATENT DOCUMENTS

| | | |
|---|---|---|
| EP | 0292280 A1 * | 11/1988 |
| JP | 5-209678 | 8/1993 |
| JP | 2639143 | 4/1997 |
| JP | 2480345 | 5/1998 |
| JP | 2000-71819 | 3/2000 |

* cited by examiner

*Primary Examiner*—Roger Pang
(74) *Attorney, Agent, or Firm*—Posz Law Group, PlC

(57) ABSTRACT

An apparatus is provided for controlling a joint force of a friction-joint component placed in a torque transmitting mechanism (e.g., transmission) mounted on a vehicle. The friction-joint component is connected to a drive source. The apparatus comprises a guideline producing unit, joint force controlling unit, and drive force controlling unit. The guideline producing unit produces a first target operation guideline for the torque transmitting mechanism and a second target operation guideline for the drive source. The first target operation guideline includes a transmitted torque capacity of the torque transmitting mechanism. The joint force controlling unit controls the joint force based on the first target operation guideline. The controlling unit includes a unit setting a value to the joint force depending on the information regulating the transmitted torque capacity. The drive force controlling unit controls a drive force of the drive source based on the second target operation guideline.

77 Claims, 16 Drawing Sheets

METHOD AND APPARATUS FOR CONTROLLING JOINT FORCE OF FRICTION-JOINT COMPONENT MOUNTED ON VEHICLE

BACKGROUND OF THE INVENTION

1. The field of the Invention

The present invention relates to a method and apparatus for controlling a drive force of a vehicle, and in particular, to the method and apparatus for controlling a drive force in an vehicle's apparatus in which a running torque (i.e., the drive force) is transmitted from a drive source to a drive shaft via a torque transmission mechanism with a friction-jointed component.

2. Related Art

A conventional integration control system for a vehicle has been proposed, for example, by a United States Patent publication No. U.S. Pat. No. 6,292,741 B1. In this motor vehicle control system, a control system is divided into, at least, a body and compartment, vehicle movement, vehicle electric system, and driving apparatus, and then the driving apparatus is further divided into, at a minimum, a transmission, converter, and engine. Hence the entire control system is gradually divided into smaller systems, so that the entire control system is configured on a hierarchical structure. This hierarchical structure prevents not merely the vehicle control system from being complicated but also man hours necessary for developing the vehicle control system from being increased.

In cases where the entire vehicle system is hierarchised in its integration control, some of conventional different controls are treated at the same hierarchical level because those controls require the same actuator, even though the functional levels of those controls are different from each other. For instance, those controls include a cruise control, which has a function performed at a vehicle level and associates with plural types of controls, and an idling speed control, which has a function performed at an individual level and associates with only a closed control of the engine. Thus, since both the cruise control and the idling speed control are in common with each other in directly controlling an opening of a throttle valve, and those two types of controls are treated at the same level from a viewpoint of only an actuator, i.e., the throttle valve to be operated for achieving the controls. The processing required for the control has been made complicated.

To be specific, a confliction of the controls performed by the same actuator should be avoided. Because controlled variables and other variables for individual control functions are assigned to an actuator, it is necessary to have an additional control to decide which control has priority over the other controls or to give a compromise to those controls. If the actuator has no function for the priority or compromise control, there is a possibility that a conflict will occur among the controls and crews feel something is strange.

In contrast, in performing the vehicle integration control, each function for the integral control is processed as follows. A function at the vehicle level is subjected to control processing for managing the entire vehicle, resulting in that the function is translated into a function at an individual system level. The function at the individual system level is then subjected to control processing at an individual system, resulting in that the function is translated into a function at an actuator level. This results in that, for instance, the foregoing cruise control is executed as control processing at the vehicle level and the idling speed control is executed as control processing at the individual level. In those controls, the upper control processing is designed to perform the foregoing priority control or compromise (matching) control, so that the processing is avoided from being complicated and is executed based on an organized control structure.

The above integration control is not limited to the control of the throttle valve, but is applied to other various types of control, such as control of ignition timing at the engine and control of a regulator of the transmission.

However, when each set of control processing is properly arranged in the vehicle integration control, an inconvenience will occur as follows. It is sufficient for the conventional control that all the processing is carried out to calculate to an amount to be operated of an actuator for operating each function itself. However, it should be required that the integration control calculate, as amounts to be operated, physical amounts at the vehicle level, which are different from an amount to be operated by each actuator. In other words, in the integration control for providing functions at the vehicle level, the physical amounts to be operated should be calculated to be in common with various types of controls or to be applicable to various types of functions.

This calculation for the integration control will now be exemplified about the vehicle transmission, which includes an automatic transmission controlling a joint state of a clutch on controlled hydraulic pressure and a belt-type gearless transmission. In the case of the conventional control that is not carried out as the integration control, the processing carried for instructing the joint state of, for example, the clutch has figured out a hydraulic command value as the physical value for the control. On the other hand, the integration control is required to perform the processing for obtaining a proper operated amount that realizes a function at the vehicle level. Thus, in the case of the processing for commanding the joint state of the clutch, it is required that the processing be carried out to have a physical variable nearer to the vehicle level than a hydraulic command value.

For instance, as shown in Japanese Patent Laid-open publication No. 5-209678, there has been known an apparatus for controlling an output of a drive unit. In this apparatus, employed is a torque-base control that uses engine torque for a physical variable in the control processing.

In the conventional or torque-base control, a premise is made such that, when the engine is controlled to have a desired torque value at a transmission output shaft or drive shaft, a joint state of a friction joint component intervening between the engine and the transmission will not fluctuate whenever any amount of torque is inputted from the engine or transmission. In other words, the conventional technique takes it into account a slip ratio (i.e., transmitted ratio) at a torque converter through which a running torque is transmitted from the engine to the torque converter and transmission.

However, actually, the joint state of the friction joint component varies depending on the magnitude of torque inputted from the engine and torque converter. By way of example, when it is supposed that the transmission according to the conventional technique is provided with a planetary gear and a clutch, there is a premise that the clutch in the transmission provides a complete connected state or a complete disconnected state in any case when the torque is transmitted from the engine and torque converter to the transmission.

However, the joint state of the clutch changes any time depending on gear changes and others. Thus, compared to the torque converter controlled to transmit a necessary amount of torque, the clutch is subjected to a larger number of uncertain factors. When a transmission-output-shaft torque or wheel-rotation torque is adjusted to a desired amount, it is therefore necessary to pay attention to the transmission torque at the friction joint component that varies depending on various factors. With no such a consideration taken, it is impossible to realize the engine output control preventing an improper slip at the friction joint component.

SUMMARY OF THE INVENTION

An object of the present invention is to provide, with due consideration to the drawbacks of the above conventional technique, a control method and a control apparatus, which are able to prevent an improper slip at the friction joint component and/or an excessive load to the friction joint component.

In order to accomplish the above object, the present invention provides, as one aspect, an apparatus for controlling a joint force of a friction-joint component placed in a torque transmitting mechanism mounted on a vehicle, the friction-joint component receives, as an input torque, a torque generated by a drive source to output the inputted torque, as an outputted torque, from the torque transmitting mechanism. The apparatus comprises a guideline producing unit, joint force controlling unit, and drive force controlling unit. The guideline producing unit is configured to produce a first target operation guideline directed to the torque transmitting mechanism and a second target operation guideline directed to the drive source. The first target operation guideline includes information regulating a transmitted torque capacity of the torque transmitting mechanism. The joint force controlling unit configured to control the joint force of the friction-joint component based on the first target operation guideline. The joint force controlling unit includes a joint force setting unit configured to set a value to the joint force depending on the information regulating the transmitted torque capacity. Still, the drive force controlling unit configured to control a drive force of the drive source based on the second target operation guideline. The drive force leading to the torque inputted to the friction-joint component.

As described above, to monitor both the drive source control and the control of the torque transmitting mechanism from a higher hierarchical level, there is provided the guideline producing unit serving as means for controlling the entire drive system. The first guideline produced by the guideline producing unit and given to the torque transmitting mechanism includes information regulating a transmitted torque capacity. Thus the torque transmitting mechanism is able to use the transmitted torque capacity to control the joint force of the friction-joint component so that the joint force meets the transmitted torque capacity that has been specified by the guideline producing unit. It is therefore possible to prevent unnecessary slips and other inconveniences about the friction-joint component.

Preferably, the information regulating the transmitted torque capacity is a transmitted-torque capacity lower limit of the torque transmitting mechanism. In this configuration, the joint force setting unit is configured to set the value to the joint force so that the transmitted torque capacity is equal to or larger than the transmitted-torque capacity lower limit.

In this configuration, because a lower limit of the transmitted torque capacity can be given to the torque transmitting component, the joint force controlling unit is able to control the friction-joint component so that the joint force is not less than the lower limit. Hence, no unnecessary slip will occur when the friction-joint component is driven.

Still preferably, the control apparatus further comprises a calculating unit configured to calculate a maximum value of the transmitted torque capacity settable by the torque transmitting mechanism. In this configuration, the guideline producing unit is configured to produce the first target operation guideline including the information regulating the transmitted torque capacity of the torque transmitting mechanism so that the transmitted-torque capacity is equal to or less than the maximum value.

This configuration allows the guideline producing unit to provide the torque transmitting mechanism with information regulating a maximum (upper limit) of the transmitted torque capacity. Hence the friction-joint component avoids an excessive load to be applied thereto.

It is also preferred that the transmitted torque capacity is regulated by both its lower and upper limits, so that an unnecessary slip at the friction-joint component and an excessive load to the friction-joint component are both prevented.

According to the present invention, as another aspect thereof, there is also provided a method of controlling a joint force of a friction-joint component placed in a torque transmitting mechanism mounted on a vehicle, the friction-joint component receives, an input torque, a torque generated by a drive source to output the inputted torque, as an outputted torque, from the torque transmitting mechanism. The method comprises the steps of: producing a first target operation guideline directed to the torque transmitting mechanism and a second target operation guideline directed to the drive source, the first target operation guideline including information regulating a transmitted torque capacity of the torque transmitting mechanism; and controlling the joint force of the friction-joint component based on the first target operation guideline, the joint force controlling including setting a value to the joint force depending on the information regulating the transmitted torque capacity and controlling a drive force of the drive source based on the second target operation guideline, the drive force leading to the torque inputted to the friction-joint component.

DETAILED DESCRIPTION OF THE PREFERRED EMBODIMENTS

Embodiments of the present invention will now be described in conjunction with the appended drawings.

(First Embodiment)

Referring to FIGS. 1 to 15, a first embodiment of the present invention will now be described.

Figure 1:
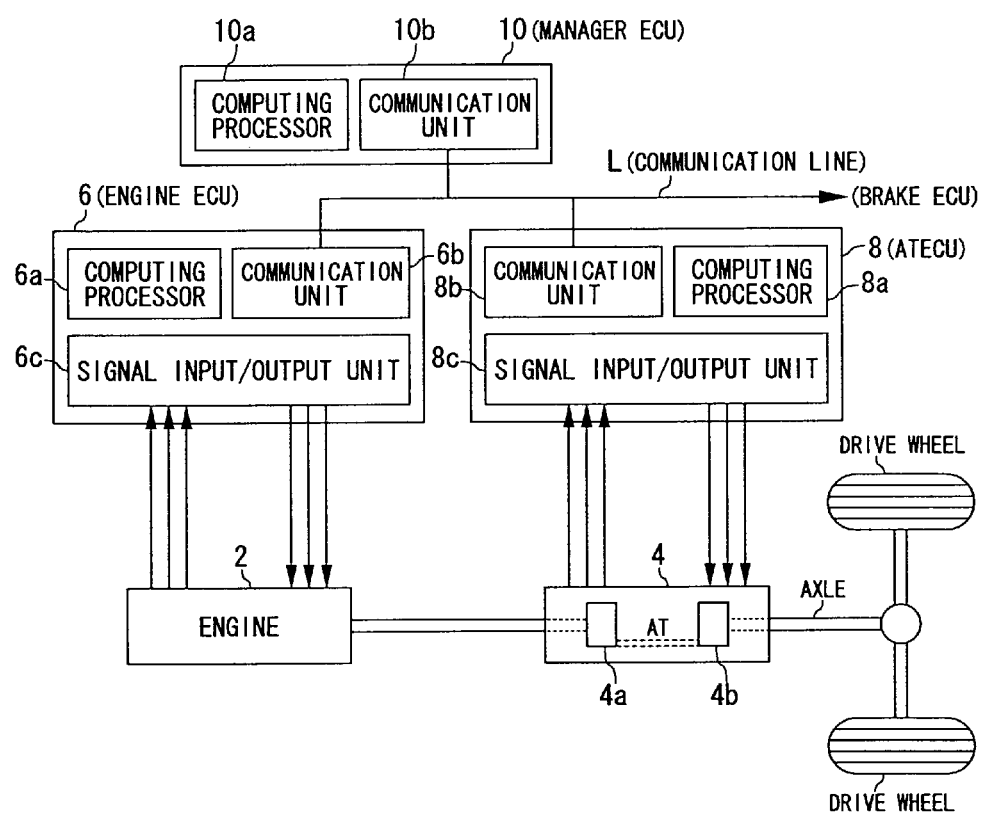
FIG. 1 is a block diagram exemplifying the entire configuration of a vehicle integration control system according to a first embodiment of the present invention.

FIG. 1 is a block diagram showing the entire configuration of a vehicle integration control system according to an embodiment of the present invention.

The vehicle integration control system according to the present embodiment is categorized into an integration control system, called power-train-system control system, in which both of an engine 2 that is a vehicle drive-system component and an automatic transmission (hereinafter referred to as simply "AT") 4 are combined for an integration control. In this integration control system, there are provided means for controlling the components of the present invention, which are composed of an engine ECU 6 and an ATECU 8 controlling the engine 2 and AT 4, respectively. The integration control system is provided with, as drive-system control means of the present invention, a manager ECU 10 that provides both the engine ECU 6 and the ATECU 8 with operation guidelines of both the engine 2 and the AT 4. Further, the engine ECU 6 composes the drive-system control means of the present invention and the ATECU 8 composes torque-transmission-mechanism control means of the present invention.

Each of the ECUs 6, 8 and 10 is an electronic control unit configured, independently on each other, by using a computing processor 6a (8a, 10a) composed of a microcomputer. The ECUs 6, 8 and 10 are individually provided with communication unit 6b, 8b and 10b connected with each other via a communication line L for data communication. Data for power train control is transmitted and received via these communication units 6b, 8b and 10b.

The engine ECU 6 and ATECU 8 are provided to control the engine 2 and AT 4, respectively. The ECU 6 and AT 8 are still provided with signal input/output units 6c and 8c, respectively, which are configured to receive detection signals of a variety of types of sensors to detect conditions of both the engine 2 and the AT 4 and to output drive signals to a variety of types of actuators placed in the engine 2 and the AT 4, respectively.

Connected to the signal input/output unit 6c of the engine ECU 6 are throttle pedal opening sensor detecting an amount operated at a throttle pedal by a driver; air flow meter detecting an intake air flow (i.e., air-intake); an intake air temperature sensor detecting a temperature of intake air; a throttle opening sensor detecting an opening of the throttle pedal; an oxygen density sensor detecting an oxygen density in exhausted air; a knock sensor detecting a knocking phenomenon occurring in the engine; a water temperature sensor detecting a temperature of cooling water; a crack angle sensor detecting a rotation angle and/or rotation speed of a crack shaft; and a group of other sensors and switches such as ignition switch.

In addition, this signal input/output unit 6c is also connected with injectors arranged in the engine 2, cylinder by cylinder; igniters generating igniting high voltage, a fuel pump pumping up fuel from a fuel tank to supply the pumped-up fuel to the injectors; and a throttle drive motor for opening and closing the throttle valve arranged in an intake tube to the engine 2, which all belong to a variety of actuators for controlling the engine 2.

On the other hand, the signal input/output unit 8c of the ATECU 8 is coupled with sensors and switches, which include a rotation number sensor detecting the number of rotations of an input shaft extending from a torque converter 4a to a transmission 4b, which are main components of the AT 4; a vehicle speed sensor detecting a vehicle speed based on the rotations of a vehicle drive shaft coupled with an output shift of the AT 2; an oil temperature sensor detecting a temperature of an operating hydraulic oil in the AT 4; a shift position switch detecting an operated position (shifted position) of the shift lever which is operated by a driver; and a stop lamp switch detecting a condition of stop lamps that are made to light up in response to driver's braking operations (i.e., condition indicative of driver's braking operations).

The above signal input/output unit 8c is also electrically connected with solenoids of various types of actuators for AT control, which include a shift solenoid switching the position of the shift lever at the transmission; a line pressure solenoid setting a control original pressure in a hydraulic mechanism; a gearshift clutch pressure solenoid operating an engaging force of a gearshift clutch; and a lock-up pressure solenoid operating a joint force of a lock-up clutch to joint the input and output shafts of the torque converter 4a.

Also connected to the communication line L is a not-shown brake ECU, which is in charge of sending a non-drive wheel rotation speed to the manager ECU 10 through the communication line L.

In each of the foregoing ECUs 6, 8 and 10, the computer processor 6a (8a, 10a) operates in accordance with control programs previously stored in its memory so that control processing (that is, engine control processing, AT control processing, and power train control processing) is performed for controlling the engine 2, AT4, and the entire system. Hereinafter, the control processing executed by each of the ECUs 6, 8 and 10 will now be explained.

Figure 2:
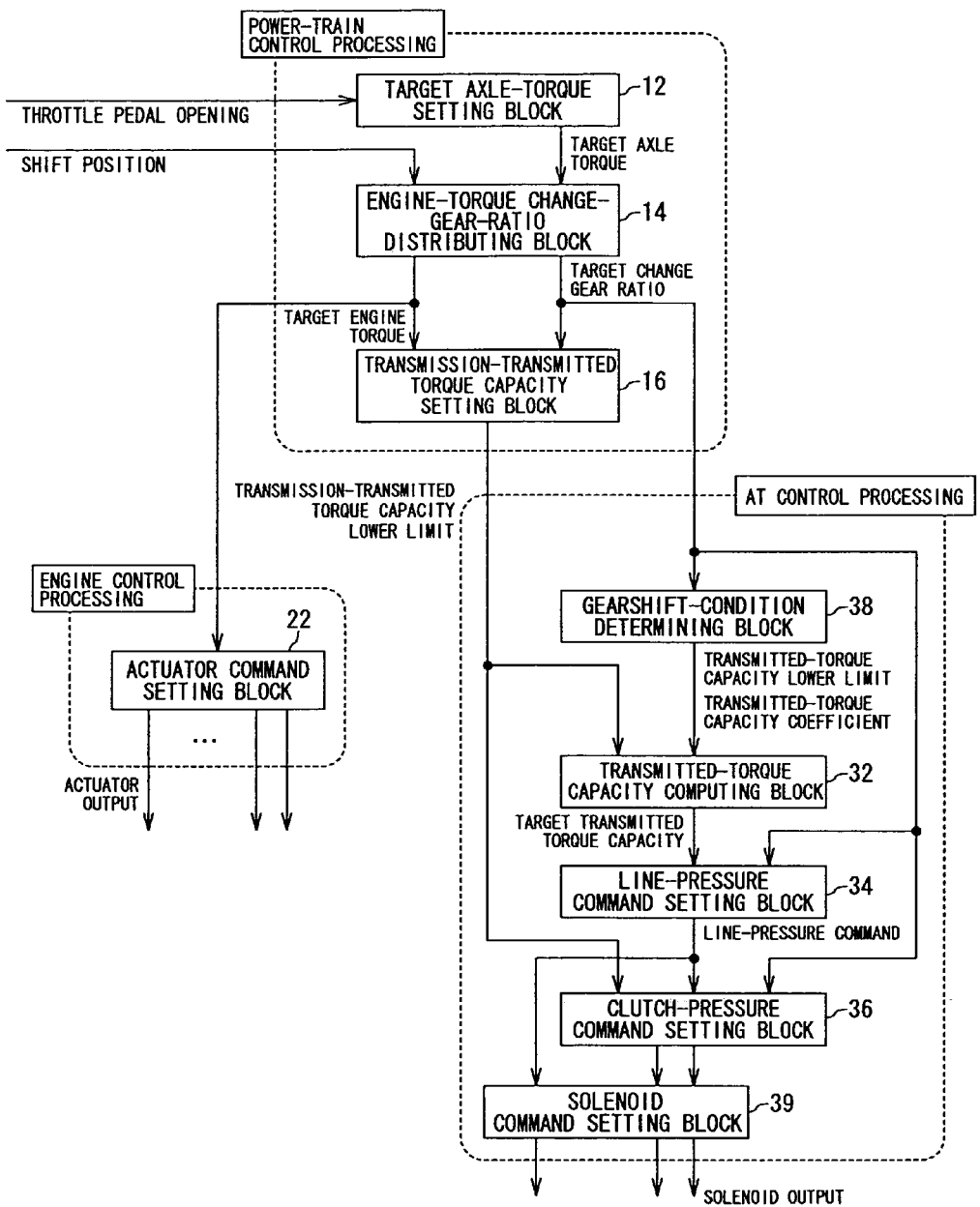
FIG. 2 is a block diagram showing vehicle control functions carried out by ECUs incorporated in the vehicle integration control system.

FIG. 2 is a functional block diagram indicative of control processing executed by each of the ECUs 6, 8 and 10.

As shown in FIG. 2, the power-train control processing executed by the manager ECU 10 includes three processing blocks consisting of a target axle-torque setting block 12, engine-torque change-gear-ratio distributing block 14, and transmission-transmitted torque capacity setting block 16.

Figure 3:
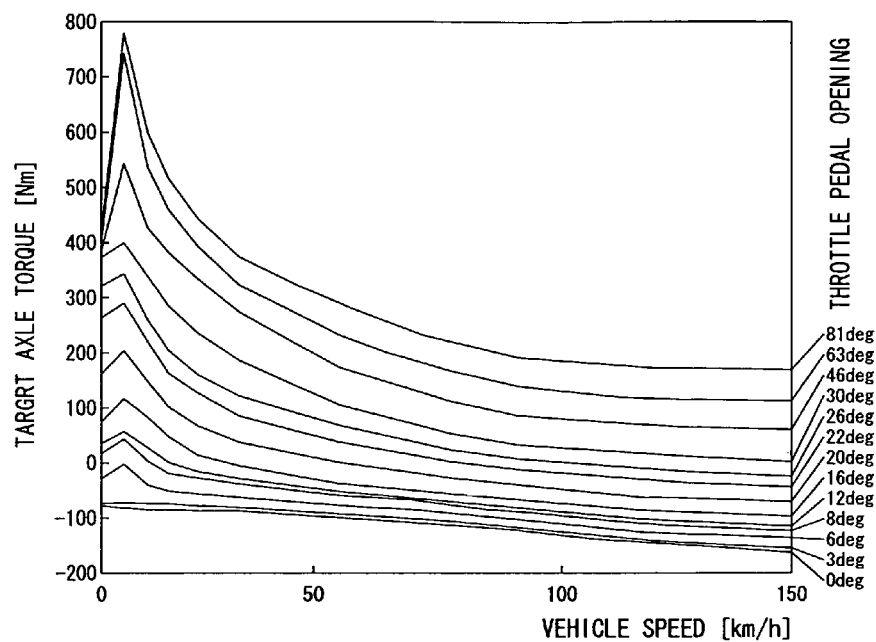
FIG. 3 shows characteristic curves defining relationships between throttle pedal openings and vehicle speeds.

The target axle-torque setting block 12 is configured to set a target axle torque on the basis of a throttle pedal opening indicating a driver's request for accelerating and decelerating a vehicle and a drive wheel rotation speed, i.e., vehicle speed, indicating an actual running condition of the vehicle. This setting may be performed based on a map that defining some characteristic profiles between the throttle pedal openings and the vehicle speeds, as shown in FIG. 3. For setting the target axle torque, the setting block 12 is formed to receive information indicative of maximum and minimum engine torque values which can be obtained in the current engine control, such information being sent from a later-described engine control processing block, and designate a proper value between the maximum and minimum engine torque values as the target axle torque.

Figure 4:
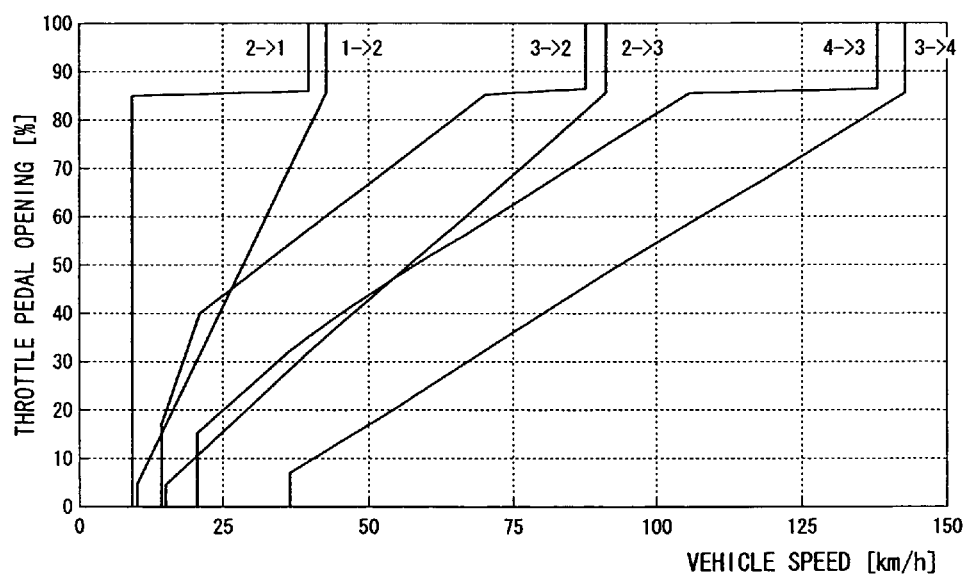
FIG. 4 explains a map for deciding a change gear ratio to be targeted.

The engine-torque change-gear-ratio distributing block 14 is configured to decide a target engine torque in consideration of a driver's desire for running, which is inferred from a gearshift lever position, over rev prevention, engine fuel consumption, emission, combustion stability or others, and gives the decided target engine torque to the engine control processing executed by the engine ECU. This setting processing can also be executed by using a map, as shown in FIG. 4, for example, in which change gear ratios to be targeted are defined between the vehicle speeds and the throttle openings. A decided target change gear ratio is used to limit the target engine torque below a transmitted torque capacity inferring value transmitted from an ATECU later described, and to supply the ATECU with the limited target engine torque as a final target engine torque.

The transmission-transmitted torque capacity setting block 16 is formed to compute a transmission-transmitted-torque capacity lower limit in view of the target axle torque, target engine torque, drive-wheel rotation speed, non-drive-wheel rotation speed, and bits of information in relation to a transmitted torque capacity at the current AT figured out by the ATECU later described. This processing will be described.

The bits of information, such as throttle pedal opening, drive-wheel rotation speed, non-drive-wheel rotation speed, gearshift position and others, which are used for calculation in the target axle-torque setting block 12, engine-torque change-gear-ratio distributing block 14, and transmission-transmitted torque capacity setting block 16, are transmitted from the engine ECU 6, ATECU 8, and brake ECU via the communication line L.

As described above, both the target engine torque and the target change gear ratio are designated by the engine-torque change-gear-ratio distributing block 14, in which the target engine torque is sent to both the engine ECU 6 and the transmission-transmitted torque capacity setting block 16, respectively, while the target change gear ratio is sent to the ATECU 8. Furthermore, the transmission-transmitted-torque capacity lower limit decided by the transmission-transmitted torque capacity setting block 16 is sent to the ATECU 8.

The engine control processing, which is carried out by the engine ECU 6, has an actuator command setting block 22. Using information indicative of an operation guideline of the engine 2 (i.e., target engine torque) sent from the manager ECU 10 (i.e., power-train control processing) and detection signals coming from the foregoing sensors and switches, the block 22 is configured to decide a throttle opening, fuel injection quantity, and ignition timing, which are necessary for realizing the target engine torque at a predetermined target air fuel ratio. Further, the actuator command setting block 22 operates based on the decided throttle opening, fuel injection quantity, and ignition timing so that the block 22 creates command values (i.e., drive signals) for driving the injector, igniters, fuel injection pump, and throttle drive motor, and gives the created command values to the individual actuators.

In addition, the engine ECU 6 also has detection circuits for detecting wire malfunctions and short circuits in the actuators and sensors, so that the engine control processing is capable of finding faults using the detected signals and changing the control processing depending on the found faults. The engine control processing is configured to further compute values of a maximum engine torque and a minimum engine torque, which can be realized under processing contents for the current engine control, and give information indicative of such torque values to the power-train control processing.

The AT control processing is carried out by the ATECU 8 and composed of a transmitted torque capacity computing block 32, line-pressure command setting block 34, clutch-pressure command setting block 36, and gearshift-condition determining block 38.

The transmitted torque capacity computing block 32 is responsible for setting a final target transmitting-torque capacity on the basis of the transmission-transmitted torque capacity lower value received from the manager ECU 10, target engine torque, target change gear ratio and others. Furthermore, this computing block 32 is responsible for a variety of types of computation regarding transmitted torque capacities, such as transmission-transmitted torque capacity figured out using the line-pressure command value and a guideline about the transmitted torque capacity to be set. Such guideline comes from the gearshift-condition determining block 38. This processing will be detailed later.

Figure 5:
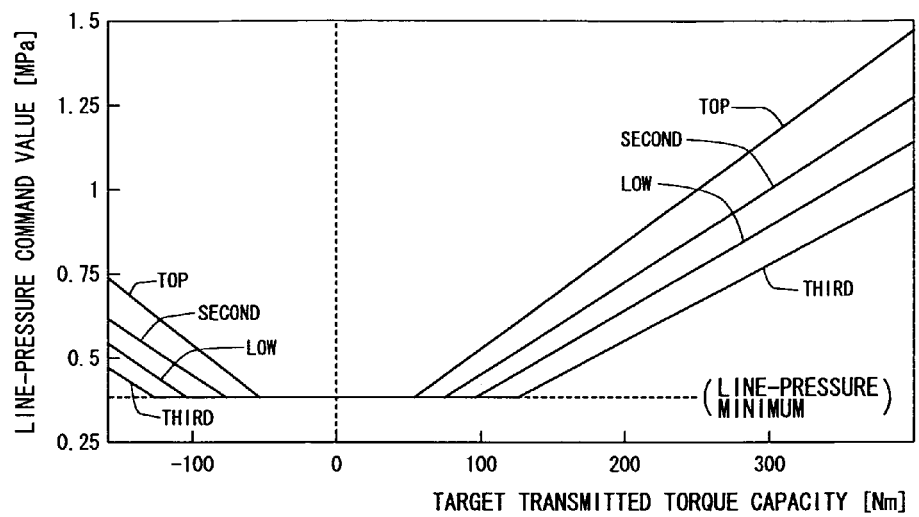
FIG. 5 explains a map for regulating line-pressure command values on the basis of a transmitted torque capacity to be targeted and a change gear ratio to be targeted.

The line-pressure command setting block 34 is formed to compute a line-pressure command value using both of the target transmitted torque capacity and the target change gear ratio that have been given. For example, as shown in FIG. 5, this computation may be done with the use of a map in which various amounts of the target transmitted torque capacity and various amounts of the target change gear ratio define line-pressure command values. The characteristic lines of the map, which are exemplified in FIG. 5, are predetermined depending on types and others of automatic transmissions. The computed line pressure from the line-pressure command setting block 34 is given to a solenoid command setting block 39. This block 39 is configured to output commands to the solenoids, in which the output values are set based on a transmitted torque capacity at the clutch of the torque converter 4a, such capacity minimizing the transmitted torque capacity to the line pressure every change gear ratio.

When the target change gear ratio sent from the manager ECU 10 (i.e., power-train control processing) differs from the current change gear ratio, the clutch-pressure command setting block 36 produces a command value for driving a change-gear-ratio switching solenoid to realize the target change gear ratio. This block 36 then gives the produced command value to the solenoid command setting block 39, so that the block 39 is able to give the command value to the change-gear-ratio switching solenoid. Concurrently the block 36 produces a further command value for driving a gearshift clutch pressure solenoid in compliance with both the target engine torque and the line-pressure command value, such command value being able to control an engaging force of the clutch that affects the gearshift. The produced command value is outputted to the solenoid command setting block 39, which then drives the gearshift clutch pressure solenoid based on the received command value.

Responsibly to a gearshift result and other factors toward a hydraulic temperature in the transmission 4b and the target change gear ratio, the gearshift-condition determining block 38 provides the transmitted torque capacity computing block 32 with a guideline of a transmitted torque capacity to be set. This processing will be detailed.

In addition, the ATECU 8 also has detection circuits for detecting wire malfunctions and short circuits in the actuators and sensors, so that the AT control processing is capable of finding faults using the detected signals and changing the control processing depending on the found faults.

The solenoid command setting block 39 also has the configuration of executing lock-up control on predetermined procedures. That is, the block 39 computes a lock-up clutch-pressure command value to realize any of lock-up states (consisting of a lock-up clutch "open," slip lock-up, and lock-up clutch "jointed"), which have been determined in consideration of fuel consumption and a feeling of gearshift, and then provides a lock-up pressure solenoid with this computed command value.

As described above, in the present embodiment, in order to enable the manager ECU 10 to control the entire system through the power-train control processing, the transmission-transmitted-torque capacity lower limit, target engine torque, and target change gear ratio are determined as being operation guidelines for the engine 2 and AT4. These guidelines are then sent to both the engine ECU 6 and the ATECU 8. In response to reception of information regarding the guidelines, the engine ECU 6 and ATECU 8 will perform the engine control processing and AT control processing, respectively, with the result that both the engine 2 and the AT 4 are controlled individually. Concurrently, maximum and minimum values of the engine torque under the current engine control and information indicative of the transmitted torque capacity value under the current AT status are sent back and reflected to and in the power-train control processing.

In the following, flowcharts are used to explain the operations of the target axle-torque setting block 12, engine-torque change-gear-ratio distributing block 14, and transmission-transmitted torque capacity setting block 16 in the manager ECU 10 and the transmitted torque capacity computing block 32, line-pressure command setting block 34 in the AT ECU 8.

First, referring to a flowchart shown in FIG. 6, the target axle-torque setting block 12 will now be explained.

At step 121, an axle torque to be targeted is calculated using the map shown in FIG. 3 in which a throttle pedal opening and a vehicle speed are given as input parameters. The characteristics shown in FIG. 3 are given in advance in consideration of an output characteristic of each type of engine and crews' feelings that each type of vehicle gives.

Figure 7:
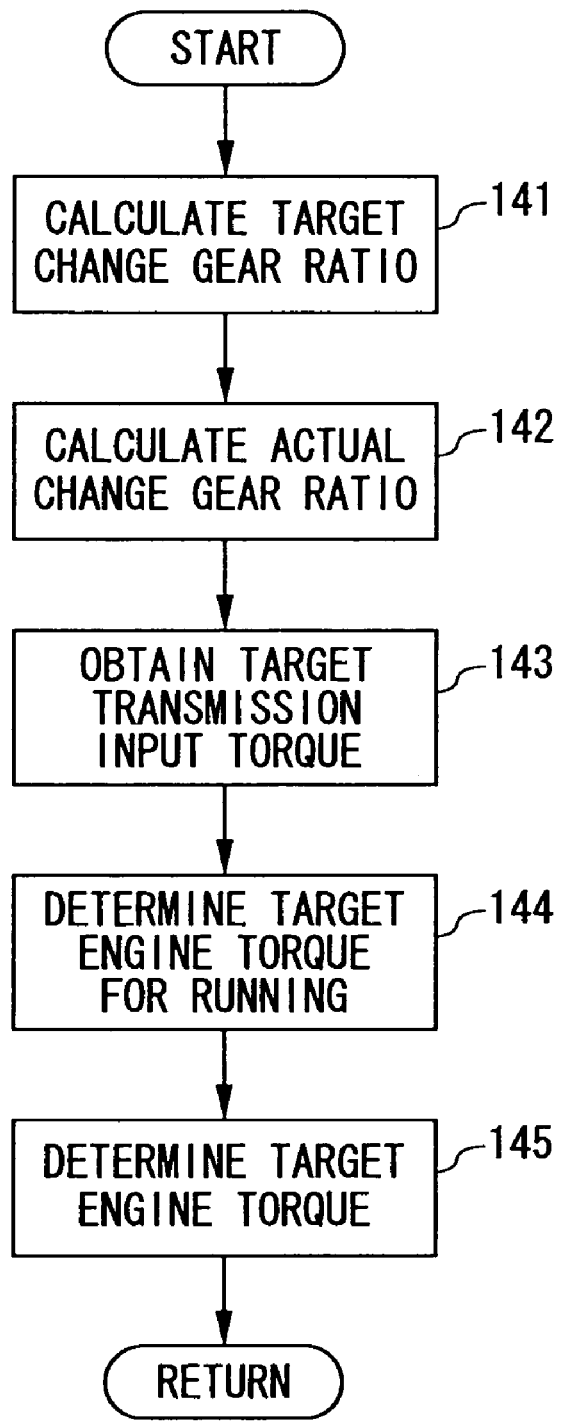
FIG. 7 is a flowchart showing processing carried out by an engine-torque change-gear-ratio distributing block.

Referring to a flowchart shown in FIG. 7, the engine-torque change-gear-ratio distributing block 14 will now be explained.

At step 141, a change gear ratio to be targeted is calculated using the map shown in FIG. 4, which requires an throttle opening and a drive wheel rotation speed (i.e., a vehicle speed) as input parameters.

The processing then goes to step S142, where an actual change gear ratio is calculated. This actual change gear ratio is figured out by dividing an inputted rotation speed from the engine 2 to the AT 4 by an outputted rotation speed from the AT 4 to the axle. The actual change gear ratio is however obtained as a value that falls into a range between a lower limit defined by a gear ratio of a maximum-speed gear and an upper limit defined by a gear ratio of a minimum-speed gear.

Figure 8:
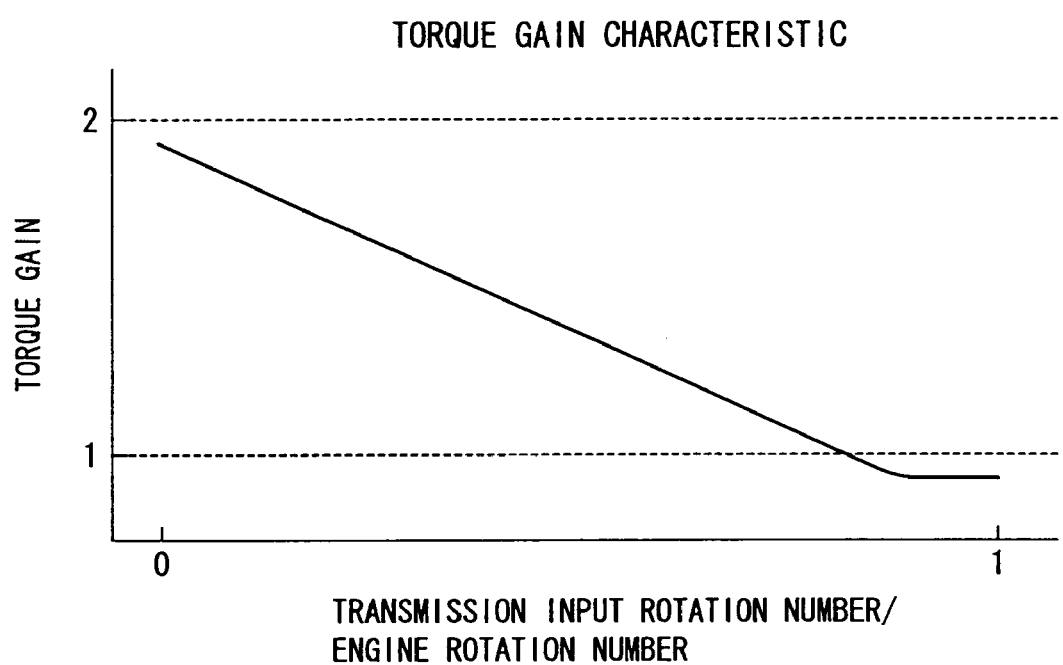
FIG. 8 explains a map regulating a torque gain decided based on the characteristic of a torque converter.

At step 143, the target axle torque is divided by the actual change gear ratio, and a resultant torque value is designated as a transmission input torque to be targeted. At step 144, the target transmission input torque, inputted rotation speed to the AT 4, engine rotation speed are used to determine an engine torque to be targeted for running (target engine torque for running). Practically, the target engine torque for running is obtained by dividing the target transmission input torque by a torque gain defined according to a characteristic of the torque converter 4a. FIG. 8 exemplifies a torque gain characteristic previously defined in compliance with not only values obtained by dividing inputted rotation speeds to the AT 4 by rotation speeds of the engine 2 but also a characteristic of each type of AT.

At step 145, a transmission-transmitted torque capacity which has been given is compared to the target engine torque for running to designate either smaller one as an engine torque to be targeted. How to calculate the transmission-transmitted torque capacity will be detailed later in connection with FIG. 10.

Figure 9:
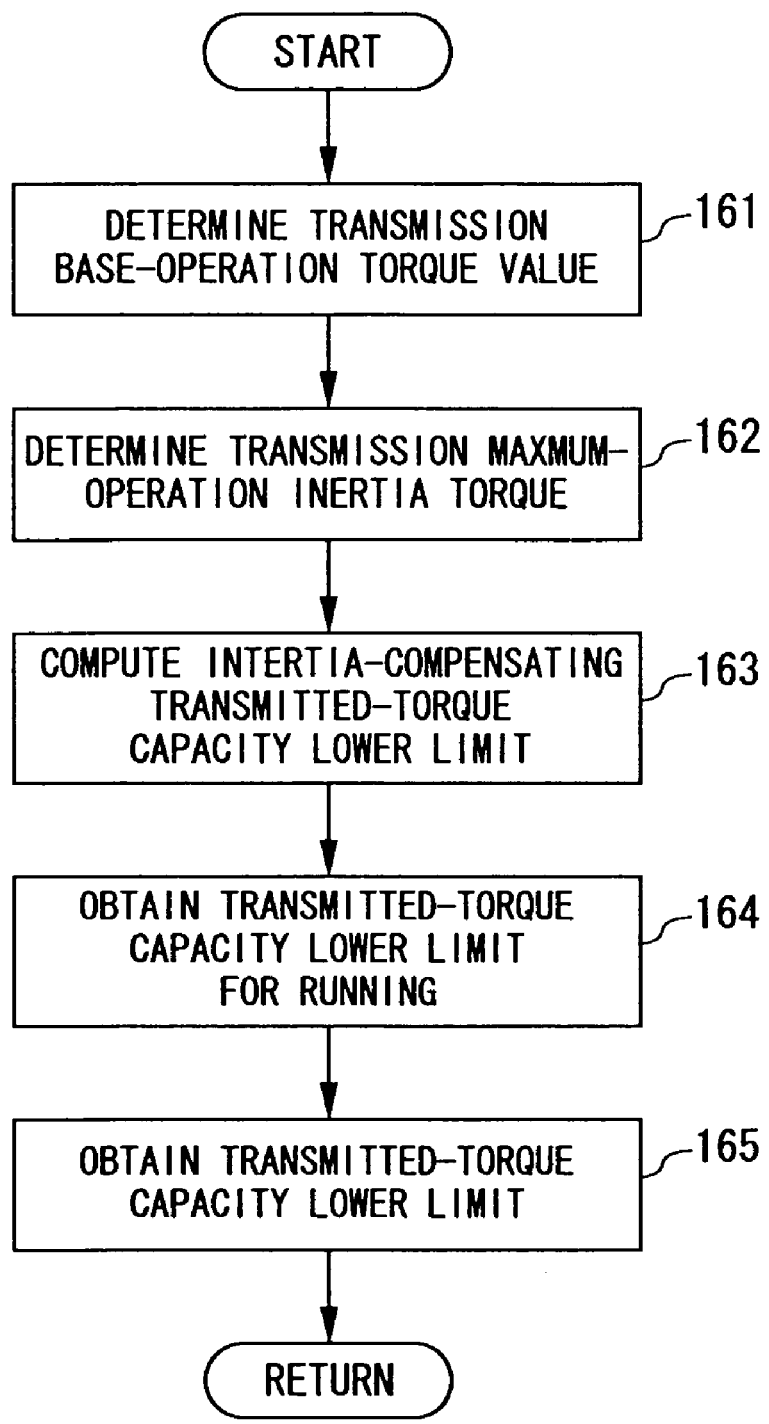
FIG. 9 is a flowchart showing processing carried out by a transmission-transmitted torque capacity setting block.

Referring to a flowchart shown in FIG. 9, the operations carried out by the transmission-transmitted torque capacity setting block 16 will now be explained.

Figure 6:
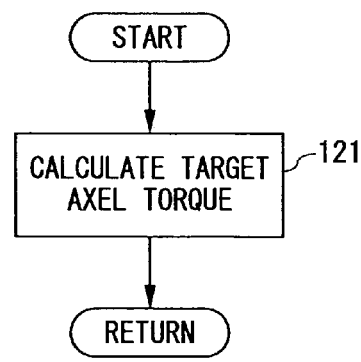
FIG. 6 is a flowchart showing processing carried out by a target axle-torque setting block.

At first, at step 161, a value of transmission base-operation torque is determined by employing the same value as the target axel torque explained concerning FIG. 6.

Then, at step 162, a value of transmission maximum-operation inertia torque is determined. To be specific, a difference between an average of the right and left drive-wheel rotation speeds and an average of the right ant left non-drive rotation speeds is obtained, and the resultant difference is multiplied by a predetermined constant, so that the inertial torque is figured out. The constant used in the multiplication is a value corresponding to rotation inertia of the drive axel. As for the transmission maximum-operation inertia torque, a maximum inertia torque to be applied to the AT 4 when a wheels spin occurs on, for example, an icy road is set. That is, because a maximum inertia torque is applied to the AT 4 in cases where a vehicle's grip is suddenly recovered from its wheels spin state (that is, in cases where the wheels spin is eliminated), the transmission maximum-operation inertial torque is set to cope with application of a maximum inertia torque during a period of the wheels spin. Alternatively, however, when the amount of a wheels spin is relatively larger, the maximum-operation inertial torque can be made larger compared to the case in which the amount of a wheels spin is smaller.

At step 163, the transmission maximum-operation inertia torque is added to the transmission base-operation torque to compute a transmission maximum-operation torque. Then, the target axle torque is subjected to processing to convert it to an engine torque to be targeted, so that a resultant torque value is assigned to an inertia-compensating transmitted-torque capacity lower limit.

At step 164, the target engine torque for running is designated as a transmitted-torque capacity lower limit for running.

Further, at step 165, using the maximum transmitted torque capacity sent from the AT 4, the inertia-compensating transmitted-torque capacity lower limit, and the transmitted-torque capacity lower limit for running, a transmitted-torque capacity lower limit is set. Concretely, first, a larger one is selected between the inertia-compensating transmitted-torque capacity lower limit and the transmitted-torque capacity lower limit for running. The thus-selected limit is compared to the maximum transmitted torque capacity so as to select either smaller one between both values. A resultant smaller value (torque capacity) is designated as the above transmitted-torque capacity lower limit. How to calculate the maximum transmitted torque capacity will be explained later with reference to FIG. 10.

Furthermore, the control processing carried out at each block of the ATECU 8 will now be described using flowcharts.

Figure 10:
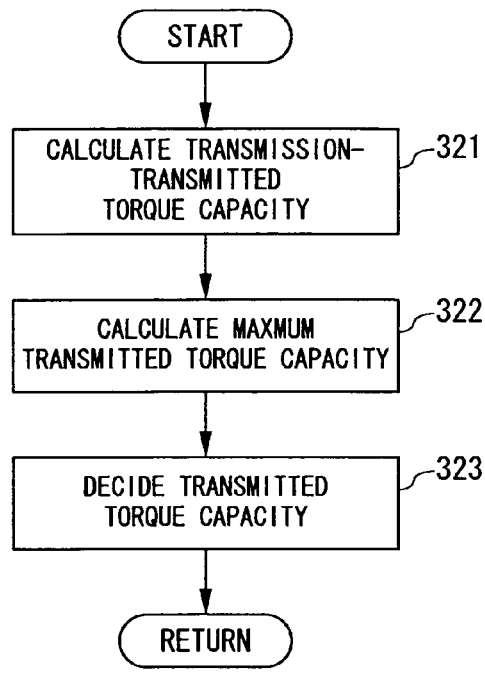
FIG. 10 represents a flowchart of processing executed by a transmitted torque capacity computing block.
Figure 11:
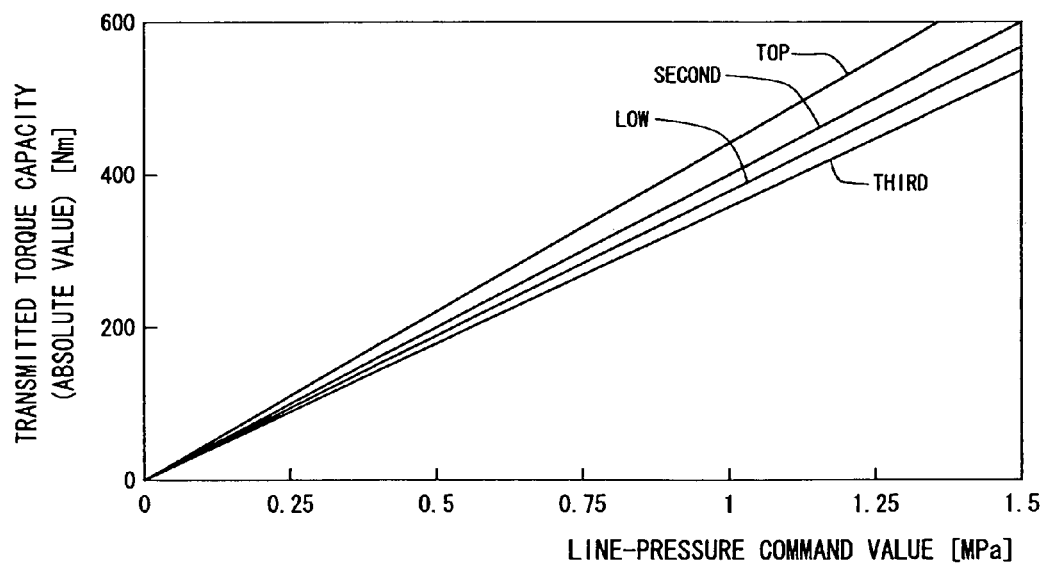
FIG. 11 shows a map in which a transmission-transmitted torque capacity is regulated by both the target change gear ratio and a line-pressure command value.

Referring to a flowchart shown in FIG. 10, the transmitted torque capacity computing block 32 will now be explained about its operations.

At first, the processing is executed at step 321, where a transmission-transmitted torque capacity is calculated. This calculation is performed with the use of a map shown in FIG. 11, in which the characteristics of the transmission-transmitted torque capacity are defined by both of target change gear ratios and line-pressure command values. This map regulates the transmitted torque capacities realized by line-pressure command values currently set toward a clutch that requires the highest clutch pressure in order to transmit the same engine torque, among all clutches that provides a joint at each of corresponding target change gear ratios. Information indicative of the target change gear ratios is given through the processing for the power-train control.

At step 322, a maximum transmitted torque capacity is calculated as being a transmitted torque capacity gained by the AT 4 when a settable maximum line pressure is given. This settable maximum line pressure is decided depending on an ejection amount of oil from the hydraulic pump driven by the engine and expressed by a map that depends on engine rotation speeds. This maximum line pressure is applied to the previous map explained at step 321 so that the maximum transferring-torque capacity is obtained.

At step 323, a transmitted torque capacity is then decided. At first, of the target engine torque obtained from the manager ECU 10 and the transmission maximum-operation inertia torque value, a value of which absolute is larger than the other is determined. An absolute value of the determined value is then assigned to a transmitted torque capacity to be requested. The required transmitted torque capacity is then multiplied by a transmitted torque capacity coefficient from the gearshift-condition determining block 38, and then, between the resultant multiplied amount and the transmission-transmitted-torque capacity lower limit, either one of which value is larger than the other is decided as being a target transmitted torque capacity. The transmission-transmitted-torque capacity lower limit is given through the power-train control processing.

Figure 12:
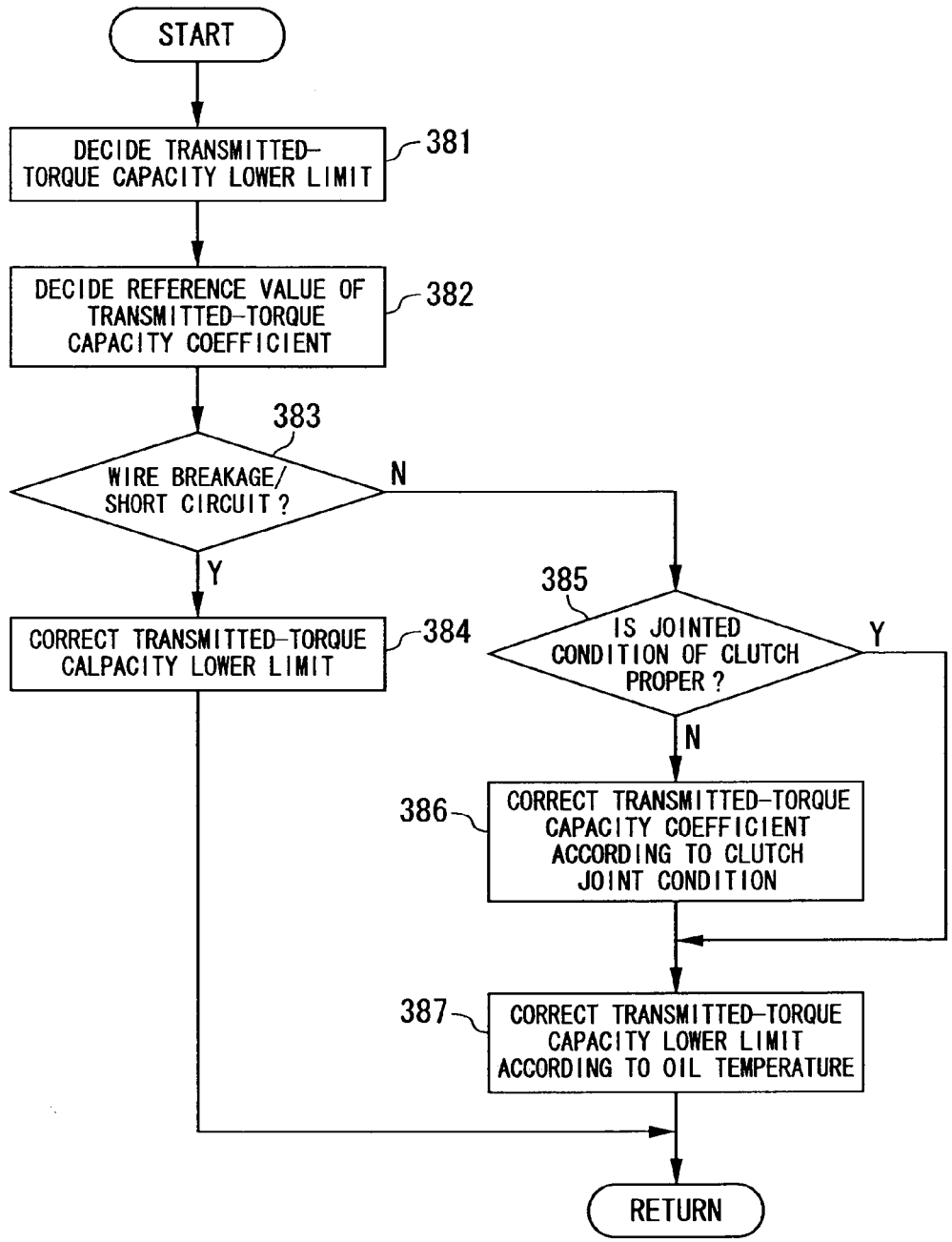
FIG. 12 represents a flowchart of processing executed by a gearshift-condition determining block.
Figure 13:
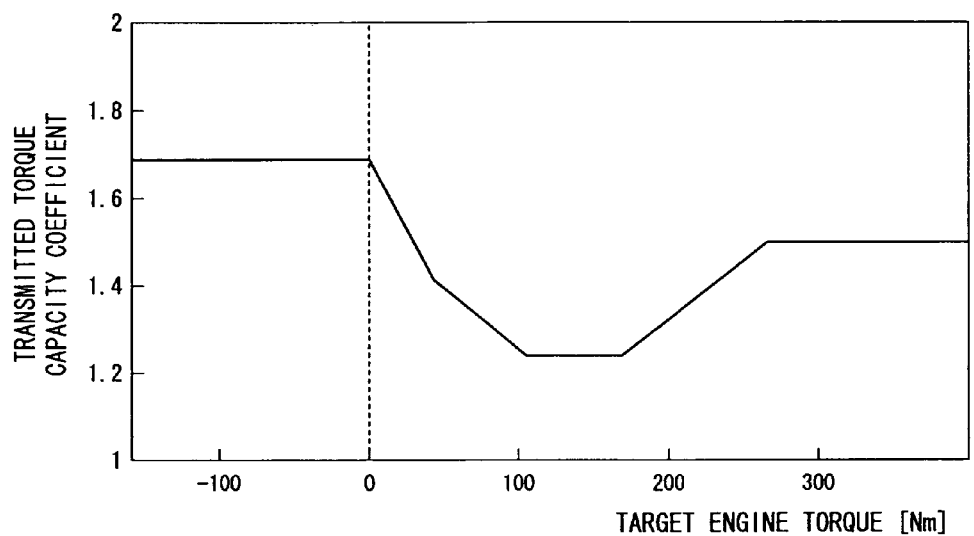
FIG. 13 depicts a map regulating a transmission capacity coefficient according to fluctuations in an engine torque to be targeted.

Referring to a flowchart shown in FIG. 12, the processing executed by the gearshift-condition determining block 38 will now be explained.

In the gearshift-condition determining block 38, a transmitted-torque capacity lower limit and a transmitted torque capacity coefficient, which are for setting a transmitted torque capacity of the AT, are determined in dependence on various conditions in the ATECU 8. The various conditions include a break of wires, short circuit, oil temperature, and input/output ratio of rotation speeds obtained when the gearshift is in no operation.

First, at step 381, a transmitted torque lower limit is decided. That is, the map shown in FIG. 11 is used again to specify a physically settable minimum line-pressure command value so that the transmitted torque lower limit is decided as a transmitted torque capacity.

At step 382, a reference value for the transmitted torque capacity coefficient is decided. This reference value serves as a safety factor for preventing a lack of the transmitted torque capacity and is decided using a map in which fluctuations in setting the line-pressure command value and fluctuations in the engine torque. For instance, the map shown in FIG. 13 exemplifies transmitted torque capacity coefficients in dependence on fluctuations in the target engine torque.

Then at step 383, a detection signal indicative of the wire brakeage and/or short circuit is used to determine whether or not there are wire breakage and/or short circuit. If the determination is affirmative (the wire breakage and/or short circuit have been found), the processing is made to go to the step 384, where the value of a maximum transmitted torque capacity is specified as the transmitted-torque capacity lower limit, before the processing ends. In this case, the transmitted torque capacity coefficient is kept to a value decided at step 382.

In contrast, when the determination at step 383 is negative, that is, there have been no wire breakage and/or short circuit, the processing proceeds to step 385, at which a determination is made to detect a jointed condition of the clutch. This determination is carried out as follows. During a non-gearshift operation of the clutch, in cases where the absolute value of a difference between an inputted rotation speed to the AT 4 and a value obtained by multiplying an outputted rotation speed to the axle by a current change gear ratio is lower than a predetermined value, it is affirmatively determined that the jointed condition of the clutch is appropriate. In such a case, with both the transmitted-torque capacity lower limit and the transmitted torque capacity coefficient subjected no correction, the processing is handed to step 387.

Figure 14:
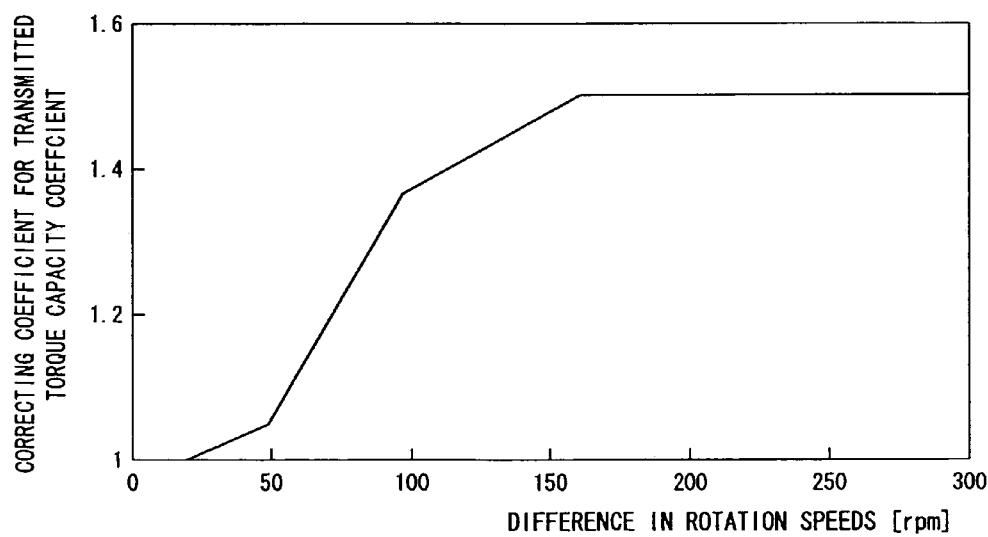
FIG. 14 depicts a map used to set a coefficient for correcting a transmitted torque capacity coefficient in compliance with a difference between an inputted rotation speed to the AT and a value produced by multiplying an outputted rotation speed to the axle by a current change gear ratio.
Figure 15:
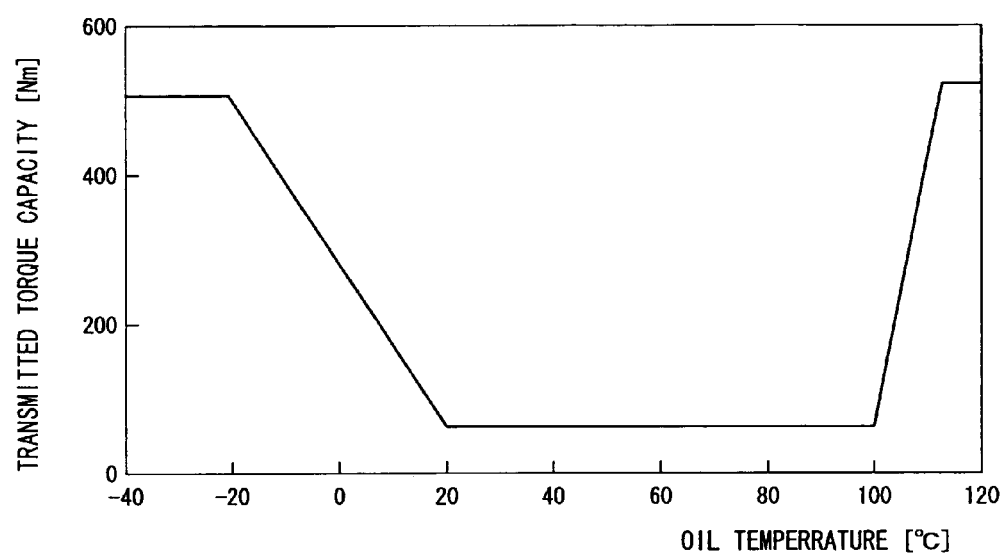
FIG. 15 is a map showing a transmitted torque capacity defined based on an AT oil temperature.

However, if a negative determination is made at step 385 (namely, the above difference in the rotation speeds is equal to or larger than the predetermined value), the processing is then carried out at step 386 to modify the transmitted torque capacity coefficient. Practically, depending on the foregoing difference in the rotation speeds (that is, the difference between an inputted rotation speed to the AT 4 and a value obtained by multiplying an outputted rotation speed to the axle by a current change gear ratio), a map shown in FIG. 14 is used to figure out a correction coefficient for the transmitted torque capacity coefficient. A value provided by multiplying the correction coefficient by the transmitted torque capacity coefficient that has been used until the last step (that is, the coefficient decided at step 382) is designated as a new transmitted torque capacity coefficient.

By the way, the predetermined value used in determining the foregoing rotation speed difference corresponds to a threshold to determine whether or not there is an improper slip at the torque converter 4*a*, which occurs due to a lack of the transmitted torque capacity. Such predetermined value is thus set to an amount of dozes of rotations per minute.

At step 387, a determination is made depending on an oil temperature at the AT 4. Concretely, either one, which is larger than the other, between the value of a transmitted torque capacity obtained from the map shown in FIG. 15 and the transmitted-torque capacity lower limit hat has used until the last step is chosen, and the chosen value is designated as a transmitted-torque capacity lower limit. In the case of the map in FIG. 15, a range from 20 to 100 degrees in centigrade is given as being in the normal state of the AT oil temperature. Hence, if the temperature is beyond such a range, the transmitted torque capacities are made larger as the oil temperature rises.

It is required for the transmission that any amount of torque inputted from the engine or the output side of the transmission will cause no improper slip at the friction-joint component, such as clutch or component of a belt and a pulley, thus ensuring a secure torque transfer. The conventional technique has been built up on the assumption that such a request was fulfilled.

However, actually, when a joint hydraulic pressure at the friction-joint component is short of a torque inputted to the transmission, a slip will be caused, leading to a situation where all the torque is not transmitted.

This raises problems in the transmission as well as in controlling the drive torque. In particular, as for the transmission, the improper slip may result in a thermal burnout or breakage of the belt or pulley, which is thus required to be avoided in a secure manner. Conventionally, it has generally been performed that an engine torque is detected to know an inputted torque to the friction-joint component and a jointing hydraulic pressure at the component is adjusted in response to the inputted torque.

However, there are various demands for the engine torque. For example, if a rapid increase of the engine torque is required due to a sudden acceleration demand, the joining hydraulic pressure is delayed in catching up the increase of the torque, thus causing a slip of the friction-joint component. Accordingly, to prevent the component from slipping steadily, the adjustment of the hydraulic pressure depending on the inputted torque is insufficient. It is also required that the inputted torque, itself, to the friction-joint component be adjusted depending on a joint condition thereof so that the component will cause no slip.

In the present embodiment, the joint condition of the friction-joint component is controlled in consideration of the drive axle torque and engine torque, whereby an improper slip at the friction-joint component is avoided securely.

Specifically, from the engine control processing block to the power-train control processing block, information indicative of a maximum drive torque and a minimum drive torque are sent, while, from the AT control processing block to the power-train control block, information indicative of a maximum transmitted torque capacity settable at the friction-joint component, an actual transmitted torque capacity, a transmitted torque capacity set to the component, an operation temperature at the component, and abnormal states are sent. The power-train control processing is carried out using those various kinds of information that have been given, so that information about a target engine torque is given to the engine control processing and information in relation to target operation guidelines, such as transmitted-torque capacity lower limit, slip of the drive shaft, maximum operation torque applied to the friction-joint component, are given to the AT control processing.

(Second Embodiment)

Referring to FIGS. 16 to 22, a second embodiment of the present invention will now be described. In the following, the constitutions and processing steps identical to those in the first embodiment will be explained using the same numerals, in which the identical constituents and processing steps are omitted from being explained.

Figure 16:
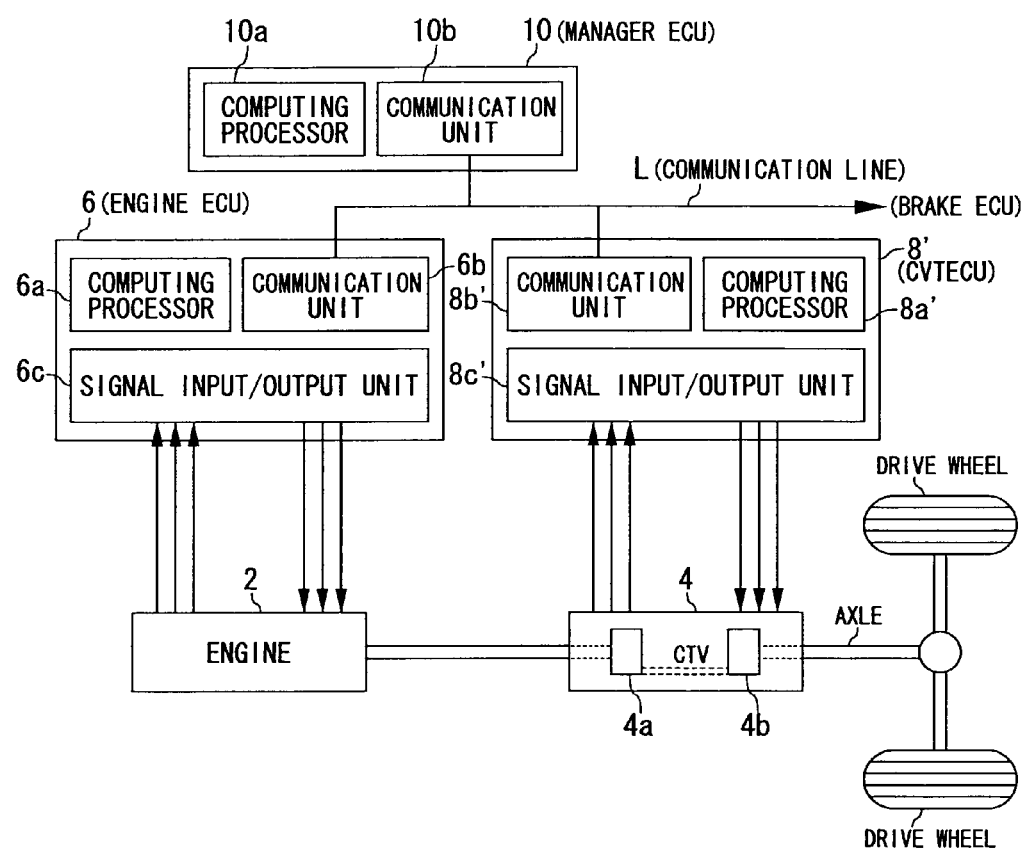
FIG. 16 is a block diagram exemplifying the entire configuration of a vehicle integration control system according to a second embodiment of the present invention.

FIG. 16 shows in block form the entire configuration of a vehicle integration control system according to the second embodiment. The second embodiment is different from the first embodiment only in that there is provided a belt-type of continuously variable transmission 4' (hereinafter referred to as CVT) and a CVTECU 8' for controlling the CVT 4', instead of the AT 4 and ATECU 8, respectively.

To a signal input/output unit 8*c*' in the CVECU 8' connected are sensors and switches, which are similar to those in the first embodiment, those sensors and switches including a rotation number sensor detecting the number of rotations of an input shaft from a torque converter 4*a*' to a transmission 4*b*', which compose the CVT 4'. In addition, for the CVT control, a variety of actuators (solenoids) are connected to the signal input/output unit 8*c*', the actuators including a secondary pressure solenoid regulating a transmitted torque in the CVT, a primary pressure solenoid regulating a change gear ratio of the CVT, a lock-up pressure solenoid for operating a joint force of a lock-up clutch jointing the input and output shafts of the torque converter, and a backward/forward switchover solenoid for operating a joint force of a backward/forward switchover clutch to switching the drive-force transmitting directions.

In the second embodiment configured as above, when control is performed based on the engine torque or axle torque, the joint condition of a friction-joint component placed between the engine and the AT is decided in dependence on operation guidelines given by the power-train control processing, the guidelines including a transmission-transmitted-torque capacity lower limit, target engine torque, and target change gear ratio. In this case, the power-train control processing receives, from the engine control processing, information indicating maximum and minimum engine torque values which can be realized currently, and also receives, from the AT control processing, information noticing a target transmitted torque capacity. Accordingly, the friction-joint component is jointed responsively to the various types of information handed from the AT and engine control processing the power-train control processing.

When an inputted torque to the friction-joint component varies, it is therefore possible to remove a situation where the friction-joint component is short of its transmitted torque capacity due to various factors. Such factors include an influence coming from a wire breakage or high temperatures, and a mechanical influence due to the fact that the friction-joint component fails to generate its hydraulic pressure in compliance with a command given thereto. An improper slip at the friction-joint component can be prevented as well. Further, a desired amount of AT output-shaft torque or wheel torque can be attained. It is also possible that a breakage of the friction-joint component can be avoided even if an excessive load is applied thereto.

The processing for the above control according to the second embodiment will now be detailed more practically.

Figure 17:
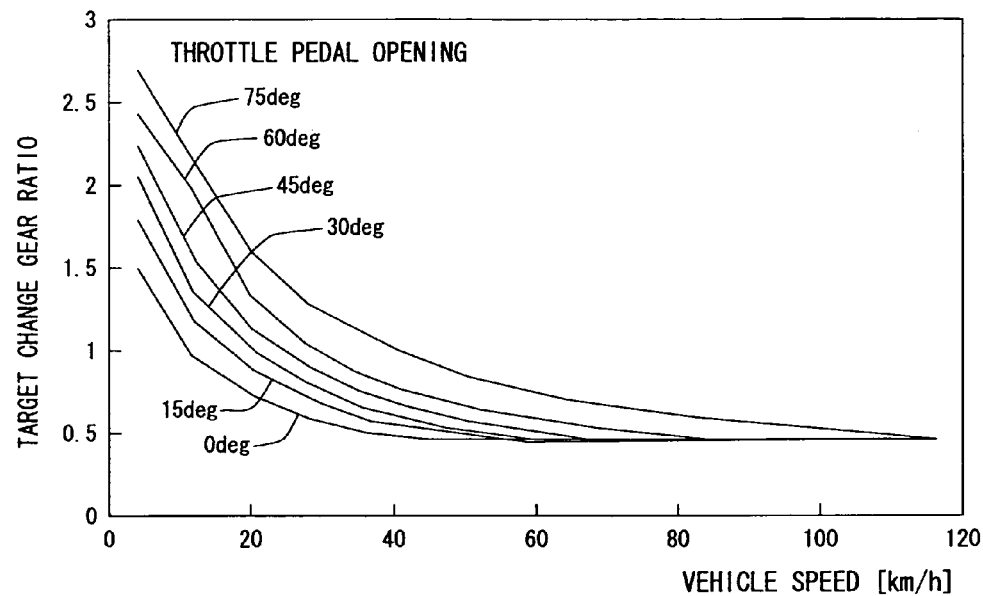
FIG. 17 explains a map for deciding a change gear ratio to be targeted in a stepless manner.
Figure 18:
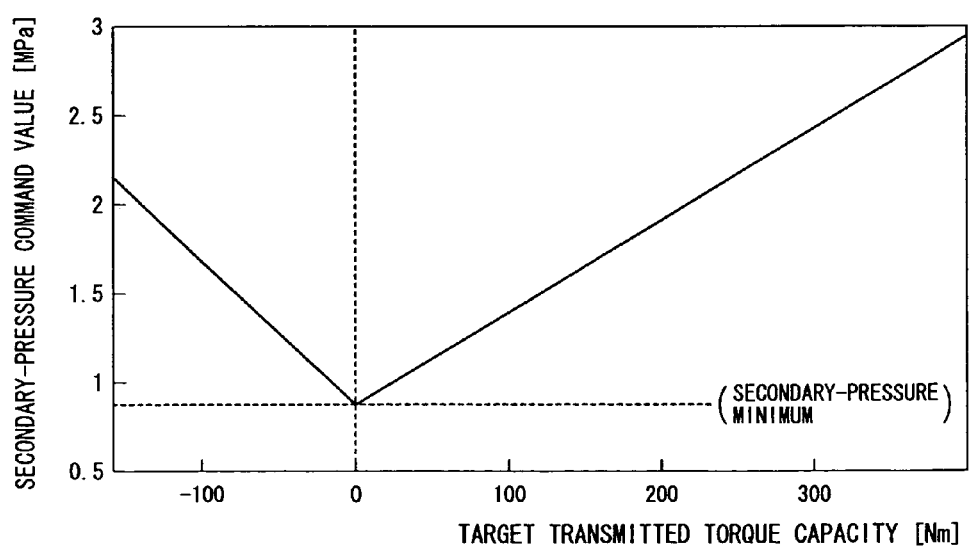
FIG. 18 explains a map for deciding a secondary-pressure command value, the map requiring as an input the target transmitted torque capacity.

The power-train control processing carried out by the manager ECU 10 is basically similar to that in the first embodiment, except that, instead of the map shown in FIG. 3 used for setting the target change gear ratio by the engine-torque change-gear-ratio distributing block 14, a map shown in FIG. 17 is used to correct a change gear ratio so that the ratio is set in a stepless manner. The map shown in FIG. 17 uses, as its input parameters, a throttle pedal opening and a vehicle speed and is subjected to computation of a target change gear ratio. The characteristics shown in FIG. 17 are given in advance in consideration of an output characteristic of each type of engine and crews' feelings that each type of vehicle gives.

Processing for CVT control carried out by the CVTECU 8' will now be described.

The CVT control processing is carried out by the computing processor 8a', which is functionally composed of a transmitted torque capacity computing block, a secondary-pressure command setting block, a primary-pressure command computing block, and a gearshift-condition determining block, which correspond, respectively, to the transmitted torque capacity computing block 32, line-pressure command setting block 34, clutch-pressure command setting block 36, and gearshift-condition determining block 38 in the first embodiment.

The transmitted torque capacity computing block is in charge of setting a transmitted-transmitted capacity lower limit to be targeted finally on the basis of a transmitted-torque capacity lower limit, a target engine torque, a target change shift ratio and others which are sent from the manager ECU 10. In addition, the transmitted torque capacity computing block is also in charge of calculating various kinds of factors of a transmitted torque capacity, such as a secondary-pressure command value and a transmission-transmitted torque capacity that is based on the guidelines from the gearshift-condition determining block. These processes include a different constant from the first embodiment, which will be detailed later.

The secondary-pressure command setting block is responsible for calculating a secondary-pressure command value by using a map shown in FIG. 8. The map shown therein requires, as an input, a target transmitted torque capacity. The calculated secondary-pressure command value is given to the secondary-pressure solenoid.

The primary-pressure command setting block is directed to cresting a command value for driving the primary pressure so that the target change gear ratio given by the manager ECU 10 becomes consistent with an actual change gear ratio. The thus-created command value is then given to the primary-pressure solenoid.

The gearshift-condition determining block is configured to respond to various factors of the CVT, such as oil temperature, gearshift result, and others, and output guidelines of a transmitted torque capacity to be set.

Figure 19:
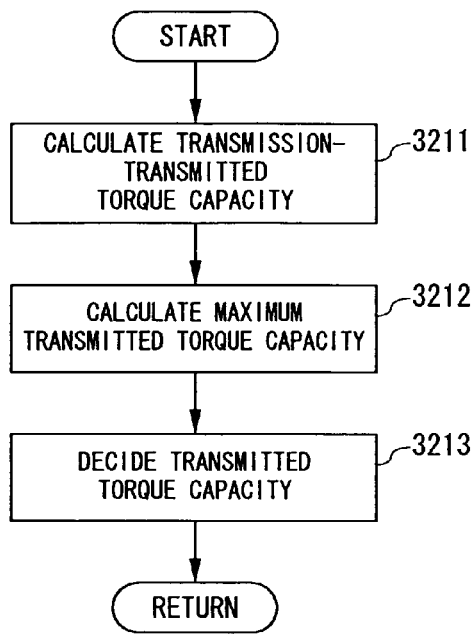
FIG. 19 is a flowchart showing processing for computation of the transmitted torque capacity in the second embodiment.

Referring to a flowchart shown in FIG. 19, the transmitted torque capacity processing will now be described.

Figure 20:
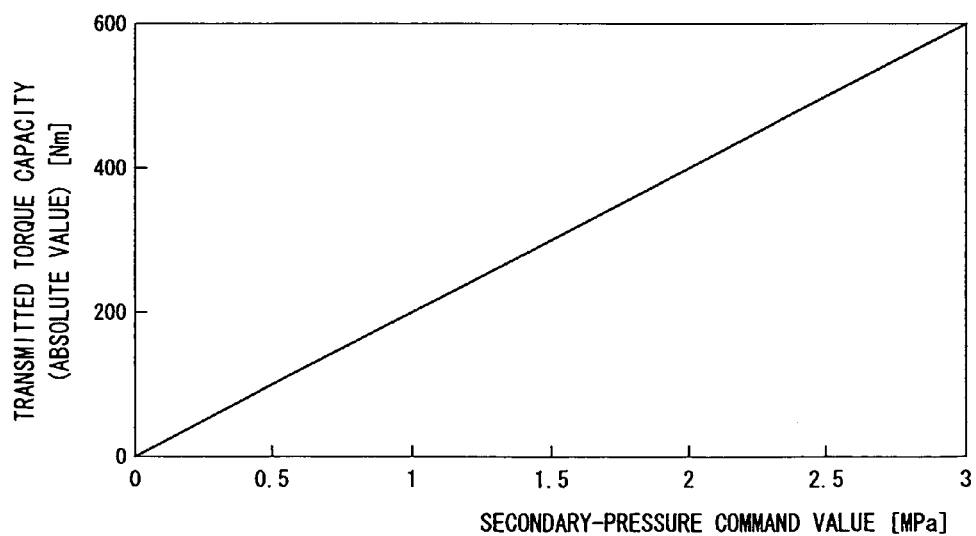
FIG. 20 is a map used to decide a transmission-transmitted torque capacity responsively to specifying a desired secondary-pressure command value.

At first, at step 3211, a transmission-transmitted torque capacity is calculated by using a map shown in FIG. 20, in which the capacities are defined so as to respond to various secondary-pressure command values. Thus, whenever a desired secondary-pressure command value is specified, a transmission-transmitted torque capacity is uniquely decided correspondingly.

At step 3212, a maximum transmitted torque capacity is then figured out. This capacity corresponds to a transmitted torque capacity that appears when setting the secondary pressure to its physically-settable maximum amount. The settable maximum secondary pressure, which is defined by an amount of hydraulic oil ejected from a hydraulic pump driven by the engine, can be obtained by making reference to a map in which ejection amounts are expressed so that the ejection amounts rise in response to a rise in engine rotation speeds. Hence, the maximum transmitted torque capacity is figured out by referring to the map shown in FIG. 20, which is used at the last step 3211 on the basis of the thus-obtained maximum secondary pressure.

The processing proceeds to step 3213, where a transmitted torque capacity at the CVT is defined. To be specific, first, the target engine torque and the maximum-operation inertia torque, which are given by the manager ECU 10, are subjected to mutual comparison, so that either one which is larger in its absolute value than the other is selected. An absolute value of the selected torque is designated as a transmitted torque capacity to be requested. The absolute value of the selected torque is multiplied by a transmitted torque capacity coefficient outputted from the gearshift-condition determining block, and a multiplied value is compared to a transmitted-torque capacity lower limit explained later. Either one, which is larger than the other, between both the multiplied value and the transmitted-torque capacity lower limit is designated as a target transmitted torque capacity and then given to the primary-pressure command setting block.

Figure 21:
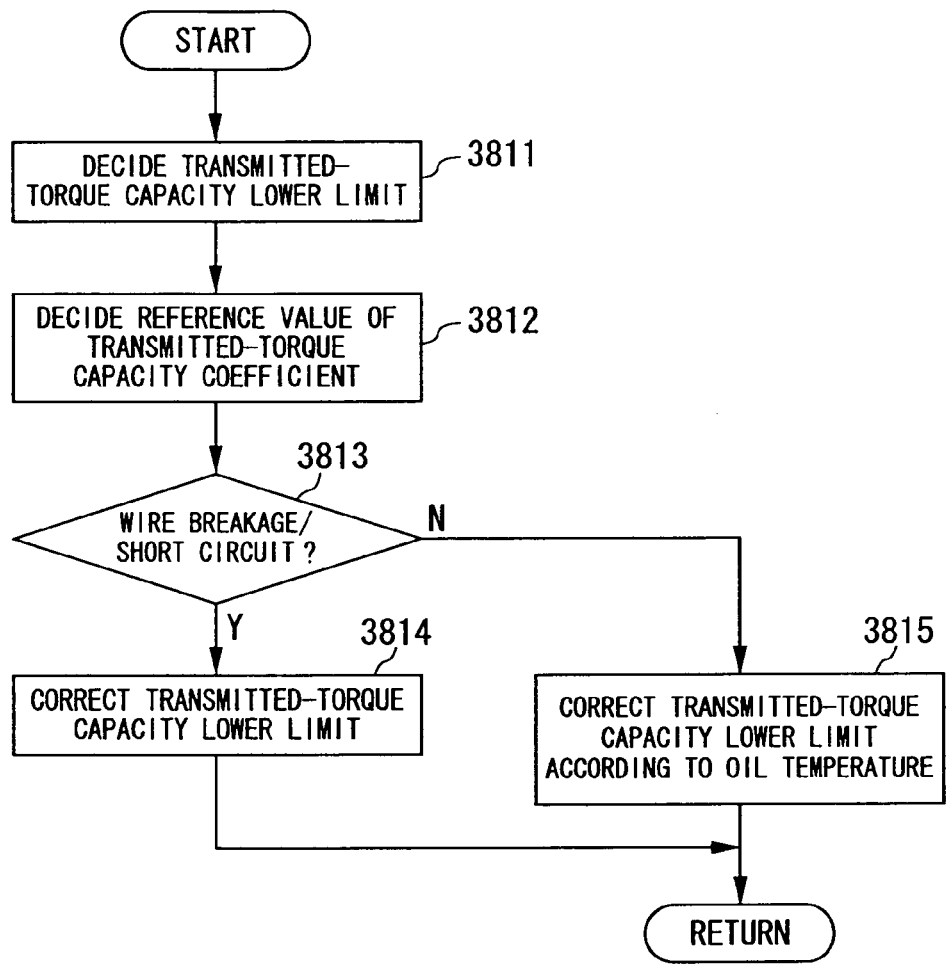
FIG. 21 shows a flowchart for processing carried out by a gearshift-condition determining block in the second embodiment.
Figure 22:
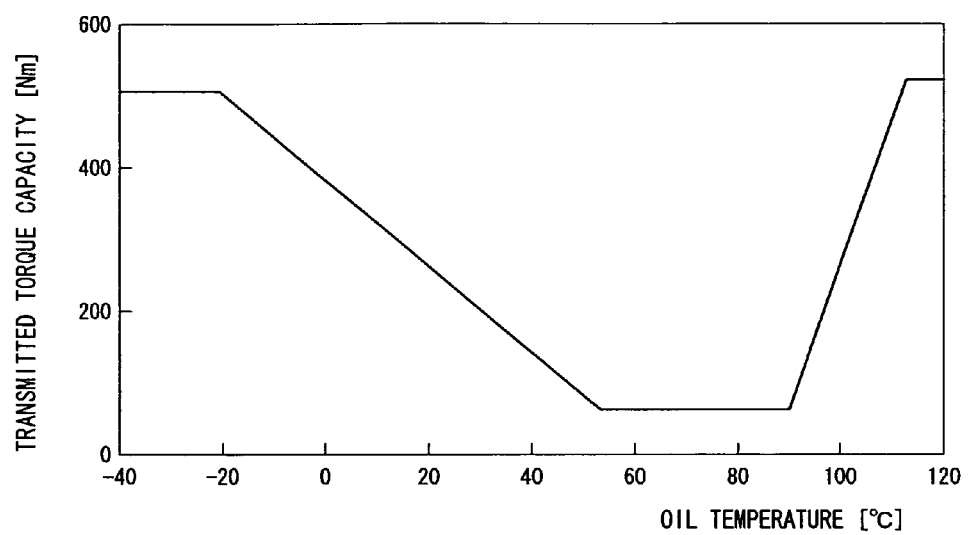
FIG. 22 explains a map to regulate a transmitted torque capacity in consideration of hydraulic oil temperatures in the second embodiment.

In connection with a flowchart shown in FIG. 21, the processing carried out by the gearshift-condition determining block will now be explained.

In accordance with various conditions of the CVTECU 8, the gearshift-condition determining block operates to decide both a transmitted-torque capacity lower limit and a transmitted torque capacity coefficient, which are for setting a transmitted torque capacity. Specifically, such conditions are information about factors consisting of a wire breakage, short circuit, and oil temperature in the sensors and actuators.

First, at step 3811, the transmitted-torque capacity lower limit is decided, and then at step 3812, a reference of the transmitted torque capacity coefficient is decided. Using the map shown in FIG. 20 again enables the transmitted-torque capacity lower limit to be specified as being a transmitted torque capacity obtained when a settable minimum secondary pressure is given.

The reference of the transmitted torque capacity coefficient is given to serve as a safety factor to prevent a shortage of the transmitted torque capacity at the CVT. This reference can be set through the reference to the map shown in FIG. 13, as explained in the first embodiment, the map taking fluctuations in the engine torque into consideration. The map may be set to consider fluctuations in only the secondary pressure that has been set or fluctuations in both the secondary pressure and the engine torque.

Then at step 3813, a detection signal indicative of the wire brakeage and/or short circuit is used to determine whether or not there are wire breakage and/or short circuit. If the determination is affirmative (the wire breakage and/or short circuit have been found), the processing is made to go to the step 3814, where the value of a maximum transmitted torque capacity is specified as the transmitted-torque capacity lower limit so that the lower limit is corrected, before the processing ends. In this case, the transmitted torque capacity coefficient is kept to a value decided at step 3812.

In contrast, when the determination at step 3813 is negative, that is, there have been no wire breakage and/or short circuit, the processing proceeds to step 3815, at which a correction is made depending on an oil temperature. To be specific, a comparison is made between the transmitted torque capacity obtained from the map shown in FIG. 22 and the transmitted torque capacity lower limit obtained at step 3811, and either one which is larger the other is set as being a transmitted torque lower limit. The transmitted torque capacity coefficient determined at step 3812 is used, as it is, in this correction.

As a result, the foregoing second embodiment is able to provide the identical operations and effects to those in the first embodiment.

For the sake of completeness, it should be mentioned that the various embodiments explained so far are not definitive lists of possible embodiments. The expert will appreciates that it is possible to combine the various construction details or to supplement or modify them by measures known from the prior art without departing from the basic inventive principle.

The entire disclosure of Japanese Patent Application No. 2002-260467 filed on Sep. 5, 2002 including the specification, claims, drawings and summary is incorporated herein by reference in its entirety.

What is claimed is:

1. An apparatus for controlling a joint force of a friction-joint component placed in a torque transmitting mechanism mounted on a vehicle, wherein the apparatus is active when the vehicle is running and the friction-joint component receives, as an input torque, a torque generated by a drive source to output the inputted torque, as an outputted torque, from the torque transmitting mechanism, comprising:
 a calculating unit configured to estimate or detect an actually transmitted torque capacity set to the torque transmitting mechanism;
 a guideline producing unit configured to produce both a first target operation guideline directed to the torque transmitting mechanism and a second target operation guideline directed to the drive source, the first target operation guideline including information regulating a transmitted torque capacity of the torque transmitting mechanism, wherein the guideline producing unit is configured to produce the second target operation guideline on the basis of the actually transmitted torque capacity;
 a joint force setting unit configured to set a value to the joint force depending on the information regulating the transmitted torque capacity;
 a joint force controlling unit configured to control the joint force of the friction-joint component based on the first target operation guideline; and
 a drive force controlling unit configured to control a drive force of the drive source based on the second target operation guideline, the drive force leading to the torque inputted to the friction-joint component.

2. The apparatus according to claim 1, wherein the guideline producing unit is configured to produce the second target operation guideline so that the inputted torque to the torque transmitting mechanism is equal to or less than the actually transmitting torque capacity.

3. The apparatus according to claim 2, further comprising a calculating unit configured to estimate a maximum torque to be applied to the to mechanism as the inputted torque,
 wherein the guideline producing unit is configured to produce the first target operation guideline indicative of the transmitted torque capacity larger than the maximum applied to the torque transmitting mechanism.

4. The apparatus according to claim 3, further comprising a unit configured to determine whether or not there is an idling of a drive shaft coupled to the friction-joint component,
 wherein the maximum torque calculating unit is configured, when there is the idling of the drive shaft, to raise the maximum torque higher than a maximum obtained when there is no idling of the drive shaft.

5. The apparatus according to claim 4, wherein the maximum torque calculating unit is configured, when there is the idling of the drive shaft, to raise the maximum torque as an amount of idling increases.

6. The apparatus according to claim 1, further comprising a calculating unit configured to calculate a maximum value of the transmitted torque capacity settable by the torque transmitting mechanism,
 wherein the information regulating the transmitted torque capacity is a transmitted-torque capacity lower limit of the torque transmitting mechanism and the joint force setting unit is configured to set the value to the joint force so that the transmitted torque capacity is equal to or larger than the transmitted-torque capacity lower limit, and
 the guideline producing unit is configured to produce the first target operation guideline including the information regulating the transmitted torque capacity of the torque transmitting mechanism so that the transmitted-torque capacity is equal to or less than the maximum value.

7. The apparatus according to claim 6, wherein the guideline producing unit has a transmitted-torque capacity producing unit configured to produce the transmitted torque capacity given to the torque transmitting mechanism in accordance with a torque applied via the inputted torque to the torque transmitting mechanism and an operated condition of the torque transmitting mechanism and a unit configured to finally designate, as the transmitted torque capacity, either one which is larger than the other between the transmitted torque capacity given to the torque transmitting mechanism and the transmitted-torque capacity lower limit.

8. The apparatus according to claim 1, further comprising a unit configured to estimate a joint condition of the friction-joint component,
 wherein the transmitted-torque capacity producing unit is configured, when the estimation unit estimates that the joint condition of the friction-joint component is improper, to raise the transmitted torque capacity given to the torque transmitting mechanism.

9. The apparatus according to claim 8, wherein the estimation unit is configured to determine that the joint condition of the friction-joint component is improper in cases where a difference between a rotation speed attributable to the inputted torque from the drive source to the friction-joint component and a further rotation speed attributable to the output torque from the friction-joint component to the drive shaft is higher than a predetermined value.

10. The apparatus according to claim 1, further comprising a unit configured to estimate an operating temperature of the torque transmitting mechanism
 wherein the transmitted-torque capacity producing unit is configured, when the estimation unit estimates that the operating temperature is outside a predetermined temperature range that gives a proper operating condition to the torque transmitting mechanism, to raise the transmitted torque capacity given to the torque transmitting mechanism.

11. The apparatus according to claim 7, further comprising a unit configured to detect a malfunction of the torque transmitting mechanism
 wherein the transmitted-torque capacity producing unit is configured, when the detection unit detects the malfunction of the torque transmitting mechanism, to change the first target operation guideline so that the transmitted torque capacity given to the torque transmitting mechanism is raised.

12. The apparatus according to claim 11, wherein the guideline producing unit includes a unit configured, in cases where the detection unit detects the malfunction of the torque transmitting mechanism, to designate the maximum value of the transmitted torque capacity as the transmitted-torque capacity lower limit.

13. The apparatus according to claim 11, wherein the guideline producing unit includes a unit configured to first determine either one which is larger than the other between the transmitted-torque capacity lower limit for correcting inertia of the drive shaft and a target engine torque for running, to second determine either one which is smaller than the other between a value determined by the first determination and the maximum value of the transmitted torque capacity, and to designate a value determined by the second determination as the transmitted-torque capacity lower limit.

14. The apparatus according to claim 1, wherein the second target operation guideline includes information indicative of a target value of engine torque, the information being given to the drive force controlling unit.

15. The apparatus according to claim 1, wherein the drive force controlling unit has a unit configured to calculate a maximum drive torque and a minimum drive torque which are currently available by the drive source that is under control of the drive force controlling unit and to give a calculated result to the guideline producing unit and
    the guideline producing unit has a unit configured to set the guidelines on the basis of the calculated result.

16. The apparatus according to claim 1, wherein the torque transmitting mechanism is a continuously variable transmission arranged in the drive shaft.

17. The apparatus according to claim 1, wherein the torque transmitting mechanism is a connected/disconnected type of transmission arranged in a drive train.

18. A method of controlling a joint force of a friction-joint component placed in a torque transmitting mechanism mounted on a vehicle, wherein the method becomes active when the vehicle is running and the friction-joint component receives, as an input torque, a torque generated by a drive source to output the inputted torque, as an outputted torque, from the torque transmitting mechanism, the method comprising the steps of:
    producing both a first target operation guideline directed to the torque transmitting mechanism and a second target operation guideline directed to the drive source, the first target operation guideline including information regulating a transmitted torque capacity of the torque transmitting mechanism;
    setting a value to the joint force depending on the information regulating the transmitted torque capacity;
    controlling both the joint force of the friction-joint component based on the first target operation guideline and a drive force of the drive source based on the second target operation guideline, the drive force leading to the torque inputted to the friction-joint component;
    calculating a maximum value of the transmitted torque capacity settable by the torque transmitting mechanism; and
    acquiring an actually transmitted torque capacity set to the torque transmitting mechanism,
    wherein
    the guideline producing step produces not only the first target operation guideline including the information regulating the transmitted torque capacity of the torque transmitting mechanism so that the transmitted-torque capacity is equal to or less than the maximum value but also the second target operation guideline on the basis of the actually transmitted torque capacity.

19. The method according to claim 18, wherein the information regulating the transmitted torque capacity is a transmitted-torque capacity lower limit of the torque transmitting mechanism, wherein
    the setting step sets the value to the joint force so that the transmitted torque capacity is equal to or larger than the transmitted-torque capacity lower limit.

20. The method according to claim 18, wherein the guideline producing step produces the second target operation guideline so that the inputted torque to the torque transmitting mechanism is equal to or less than the actually transmitted torque capacity.

21. The method according to claim 18, further comprising a step of estimating a maximum torque to be applied to the torque transmitting mechanism through the inputted torque,
    wherein the guideline producing step produces the first target operation guideline indicative of the transmitted torque capacity larger than the maximum torque applied to the torque transmitting mechanism.

22. The method according to claim 21, further comprising a step of determining whether or not there is an idling of a drive shaft coupled to the friction-joint component,
    wherein the maximum torque estimating step, when there is the idling of the drive shaft, raises the maximum torque than a maximum obtained when there is no idling of the drive shaft.

23. The method according to claim 22, wherein the maximum torque estimating step, when there is the idling of the drive shaft, raises the maximum torque as an amount of idling increases.

24. The method according to claim 18, wherein the second target operation guideline includes information indicative of a target value of engine torque, the information being given to the drive force control carried out at the controlling step.

25. The method according to claim 18, wherein the controlling step includes not only calculation of a maximum drive torque and a minimum drive torque which are currently available by the drive source that is under control of the control step but also giving a calculated result to the guideline producing step and the guideline producing step includes setting of the guidelines on the basis of the calculated result.

26. An apparatus for controlling a joint force of a friction-joint component placed in a torque transmitting mechanism mounted on a vehicle, wherein the apparatus is active when the vehicle is running and the friction-joint component receives, as an input torque, a torque generated by a drive source to output the inputted torque, as an outputted torque, from the torque transmitting mechanism, comprising:
    a calculating unit configured to estimate a maximum torque to be applied to the torque transmitting mechanism as the inputted torque;
    a guideline producing unit configured to produce both a first target operation guideline directed to the torque transmitting mechanism and a second target operation guideline directed to the drive source, the first target operation guideline including information regulating a transmitted torque capacity of the torque transmitting mechanism, wherein the guideline producing unit is configured to produce the first target operation guideline indicative of the transmitted torque capacity larger than the maximum torque applied to the torque transmitting mechanism;

a joint force setting unit configured to set a value to the joint force depending on the information regulating the transmitted torque capacity;

a joint force controlling unit configured to control the joint force of the friction-joint component based on the first target operation guideline; and a drive force controlling unit configured to control a drive force of the drive source based on the second target operation guideline, the drive force leading to the torque inputted to the friction-joint component.

27. The apparatus according to claim 26, wherein the information regulating the transmitted torque capacity is a transmitted-torque capacity lower limit of the torque transmitting mechanism, wherein the joint force setting unit is configured to set the value to the joint force so that the transmitted torque capacity is equal to or larger than the transmitted-torque capacity lower limit.

28. The apparatus according to claim 26, further comprising a calculating unit configured to calculate a maximum value of the transmitted torque capacity settable by the torque transmitting mechanism, wherein the guideline producing unit is configured to produce the first target operation guideline including the information regulating the transmitted torque capacity of the torque transmitting mechanism so that the transmitted-torque capacity is equal to or less than the maximum value.

29. The apparatus according to claim 26, further comprising a calculating unit configured to estimate or detect an actually transmitted torque capacity set to the torque transmitting mechanism, wherein the guideline producing unit is configured to produce the second target operation guideline on the basis of the actually transmitted torque capacity.

30. The apparatus according to claim 29, wherein the guideline producing unit is configured to produce the second target operation guideline so that the inputted torque to the torque transmitting mechanism is equal to or less than the actually transmitted torque capacity.

31. The apparatus according to claim 30, further comprising a unit configured to determine whether or not there is an idling of a drive shaft coupled to the friction-joint component, wherein the maximum torque calculating unit is configured, when there is the idling of the drive shaft, to raise the maximum torque higher than a maximum obtained when there is no idling of the drive shaft.

32. The apparatus according to claim 31, wherein the maximum torque calculating unit is configured, when there is the idling of the drive shaft, to raise the maximum torque as an amount of idling increases.

33. The apparatus according to claim 31, wherein the guideline producing unit includes a unit configured to first determine either one which is larger than the other between the transmitted-torque capacity lower limit for correcting inertia of the drive shaft and a target engine torque for running, to second determine either one which is smaller than the other between a value determined by the first determination and the maximum value of the transmitted torque capacity, and to designate a value determined by the second determination as the transmitted-torque capacity lower limit.

34. The apparatus according to claim 26, further comprising a calculating unit configured to calculate a maximum value of the transmitted torque capacity settable by the torque transmitting mechanism, wherein the information regulating the transmitted torque capacity is a transmitted-torque capacity lower limit of the torque transmitting mechanism and the joint force setting unit is configured to set the value to the joint force so that the transmitted torque capacity is equal to or larger than the transmitted-torque capacity lower limit, and the guideline producing unit is configured to produce the first target operation guideline including the information regulating the transmitted torque capacity of the torque transmitting mechanism so that the transmitted-torque capacity is equal to or less than the maximum value.

35. The apparatus according to claim 34, wherein the guideline producing unit has a transmitted-torque capacity producing unit configured to produce the transmitted torque capacity given to the torque transmitting mechanism in accordance with a torque applied as the inputted torque to the torque transmitting mechanism and an operated condition of the torque transmitting mechanism and a unit configured to finally designate, as the transmitted torque capacity, either one which is larger than the other between the transmitted torque capacity given to the torque transmitting mechanism and the transmitted-torque capacity lower limit.

36. The apparatus according to claim 35, further comprising a unit configured to detect a malfunction of the torque transmitting mechanism wherein the transmitted-torque capacity producing unit is configured, when the detection unit detects the malfunction of the torque transmitting mechanism, to change the first target operation guideline so that the transmitted torque capacity given to the torque transmitting mechanism is raised.

37. The apparatus according to claim 36, wherein the guideline producing unit includes a unit configured, in cases where the detection unit detects the malfunction of the torque transmitting mechanism, to designate the maximum value of the transmitted torque capacity as the transmitted-torque capacity lower limit.

38. The apparatus according to claim 36, wherein the guideline producing unit includes a unit configured to first determine either one which is larger than the other between the transmitted-torque capacity lower limit for correcting inertia of the drive shaft and a target engine torque for running, to second determine either one which is smaller than the other between a value determined by the first determination and the maximum value of the transmitted torque capacity, and to designate a value determined by the second determination as the transmitted-torque capacity lower limit.

39. The apparatus according to claim 26, further comprising a unit configured to estimate a joint condition of the friction-joint component, wherein the transmitted-torque capacity producing unit is configured, when the estimation unit estimates that the joint condition of the friction-joint component is improper, to raise the transmitted torque capacity given to the torque transmitting mechanism.

40. The apparatus according to claim 39, wherein the estimation unit is configured to determine that the joint condition of the friction-joint component is improper in cases where a difference between a rotation speed attributable to the inputted torque from the drive source to the friction-joint component and a further rotation speed attributable to the output torque from the friction-joint component to the drive shaft is higher than a predetermined value.

41. The apparatus according to claim 26, further comprising a unit configured to estimate an operating temperature of the torque transmitting mechanism wherein the transmitted-torque capacity producing unit is configured, when the estimation unit estimates that the operating temperature is outside a predetermined temperature range that gives a proper operating condition to the torque transmitting mechanism, to raise the transmitted torque capacity given to the torque transmitting mechanism.

42. The apparatus according to claim 26, wherein the second target operation guideline includes information indicative of a target value of engine torque, the information being given to the drive force controlling unit.

43. The apparatus according to claim 26, wherein the drive force controlling unit has a unit configured to calculate a maximum drive torque and a minimum drive torque which are currently available by the drive source that is under control of the drive force controlling unit and to give a calculated result to the guideline producing unit and the guideline producing unit has a unit configured to set the guidelines on the basis of the calculated result.

44. The apparatus according to claim 26, wherein the torque transmitting mechanism is a connected/disconnected type of transmission arranged in a drive train of the vehicle.

45. An apparatus for controlling a joint force of a friction-joint component placed in a torque transmitting mechanism mounted on a vehicle, wherein the apparatus becomes active when the vehicle is running and the friction-joint component receives, as an input torque, a torque generated by a drive source to output the inputted torque, as an outputted torque, from the torque transmitting mechanism, comprising:

a guideline producing unit configured to produce both a first target operation guideline directed to the torque transmitting mechanism and a second target operation guideline directed to the drive source, the first target operation guideline including information regulating a transmitted torque capacity of the torque transmitting mechanism;

a joint force setting unit configured to set a value to the joint force depending on the information regulating the transmitted torque capacity;

a joint force controlling unit configured to control the joint force of the friction-joint component based on the first target operation guideline;

a drive force controlling unit configured to control a drive force of the drive source based on the second target operation guideline, the drive force leading to the torque inputted to the friction-joint component; and a unit configured to estimate a joint condition of the friction-joint component, wherein the guideline producing unit has a transmitted-torque capacity producing unit configured to not only produce the transmitted torque capacity given to the torque transmitting mechanism in accordance with a torque applied as the inputted torque to the torque transmitting mechanism and an operated condition of the torque transmitting mechanism but also raise the transmitted torque capacity given to the torque transmitting mechanism in cases where the estimation unit estimates that the joint condition of the friction-joint component is improper.

46. The apparatus according to claim 45, wherein the information regulating the transmitted torque capacity is a transmitted-torque capacity lower limit of the torque transmitting mechanism, wherein the joint force setting unit is configured to set the value to the joint force so that the transmitted torque capacity is equal to or larger than the transmitted-torque capacity lower limit.

47. The apparatus according to claim 45, further comprising a calculating unit configured to calculate a maximum value of the transmitted torque capacity settable by the torque transmitting mechanism, wherein the guideline producing unit is configured to produce the first target operation guideline including the information regulating the transmitted torque capacity of the torque transmitting mechanism so that the transmitted-torque capacity is equal to or less than the maximum value.

48. The apparatus according to claim 45, further comprising a calculating unit configured to estimate or detect an actually transmitted torque capacity set to the torque transmitting mechanism, wherein the guideline producing unit is configured to produce the second target operation guideline on the basis of the actually transmitted torque capacity.

49. The apparatus according to claim 48, wherein the guideline producing unit is configured to produce the second target operation guideline so that the inputted torque to the torque transmitting mechanism is equal to or less than the actually transmitted torque capacity.

50. The apparatus according to claim 49, further comprising a calculating unit configured to estimate a maximum torque to be applied to the torque transmitting mechanism as the inputted torque, wherein the guideline producing unit is configured to produce the first target operation guideline indicative of the transmitted torque capacity larger than the maximum torque applied to the torque transmitting mechanism.

51. The apparatus according to claim 50, further comprising a unit configured to determine whether or not there is an idling of a drive shaft coupled to the friction-joint component, wherein the maximum torque calculating unit is configured, when there is the idling of the drive shaft, to raise the maximum torque higher than a maximum obtained when there is no idling of the drive shaft.

52. The apparatus according to claim 51, wherein the maximum torque calculating unit is configured, when there is the idling of the drive shaft, to raise the maximum torque as an amount of idling increases.

53. The apparatus according to claim 45, further comprising a unit configured to detect a malfunction of the torque transmitting mechanism wherein the transmitted-torque capacity producing unit is configured, when the detection unit detects the malfunction of the torque transmitting mechanism, to change the first target operation guideline so that the transmitted torque capacity given to the torque transmitting mechanism is raised.

54. The apparatus according to claim 52, wherein the guideline producing unit includes a unit configured, in cases where the detection unit detects the malfunction of the torque transmitting mechanism, to designate the maximum value of the transmitted torque capacity as the transmitted-torque capacity lower limit.

55. The apparatus according to claim 45, wherein the estimation unit is configured to determine that the joint condition of the friction-joint component is improper in cases where a difference between a rotation speed attributable to the inputted torque from the drive source to the friction-joint component and a further rotation speed attributable to the output torque from the friction-joint component to the drive shaft is higher than a predetermined value.

56. The apparatus according to claim 45, further comprising a unit configured to estimate an operating temperature of the torque transmitting mechanism
wherein the transmitted-torque capacity producing unit is configured, when the estimation unit estimates that the operating temperature is outside a predetermined temperature range that gives a proper operating condition to the torque transmitting mechanism, to raise the transmitted torque capacity given to the torque transmitting mechanism.

57. The apparatus according to claim 45, wherein the second target operation guideline includes information indicative of a target value of engine torque, the information being given to the drive force controlling unit.

58. The apparatus according to claim 45, wherein the drive force controlling unit has a unit configured to calculate a maximum drive torque and a minimum drive torque which are currently available by the drive source that is under control of the drive force controlling unit and to give a calculated result to the guideline producing unit and
the guideline producing unit has a unit configured to set the guidelines on the basis of the calculated result.

59. The apparatus according to claim 45, wherein the torque transmitting mechanism is a connected/disconnected type of transmission arranged in a drive train of the vehicle.

60. The apparatus according to claim 45, further comprising a calculating unit configured to calculate a maximum value of the transmitted torque capacity settable by the torque transmitting mechanism,
wherein the information regulating the transmitted torque capacity is a transmitted-torque capacity lower limit of the torque transmitting mechanism and the joint force setting unit is configured to set the value to the joint force so that the transmitted torque capacity is equal to or larger than the transmitted-torque capacity lower limit, and
the guideline producing unit is configured to produce the first target operation guideline including the information regulating the transmitted torque capacity of the torque transmitting mechanism so that the transmitted-torque capacity is equal to or less than the maximum value.

61. The apparatus according to claim 60, wherein the guideline producing unit has a unit configured to finally designate, as the transmitted torque capacity, either one which is larger than the other between the transmitted torque capacity given to the torque transmitting mechanism and the transmitted-torque capacity lower limit.

62. The apparatus according to claim 45, wherein the guideline producing unit has a unit configured to finally designate, as the transmitted torque capacity, either one which is larger than the other between the transmitted torque capacity given to the torque transmitting mechanism and the transmitted-torque capacity lower limit.

63. A method of controlling a joint force of a friction-joint component placed in a torque transmitting mechanism mounted on a vehicle, wherein the method becomes active when the vehicle is running and the friction-joint component receives, as an input torque, a torque generated by a drive source to output the inputted torque, as an outputted torque, from the torque transmitting mechanism, the method comprising the steps of:
producing both a first target operation guideline directed to the torque transmitting mechanism and a second target operation guideline directed to the drive source, the first target operation guideline including information regulating a transmitted torque capacity of the torque transmitting mechanism;
setting a value to the joint force depending on the information regulating the transmitted torque capacity;
controlling both the joint force of the friction-joint component based on the first target operation guideline and a drive force of the drive source based on the second target operation guideline, the drive force leading to the torque inputted to the friction-joint component; and
estimating a maximum torque to be applied to the torque transmitting mechanism as the inputted torque,
wherein the guideline producing step produces the first target operation guideline indicative of the transmitted torque capacity larger than the maximum torque applied to the torque transmitting mechanism.

64. The method according to claim 63, wherein the information regulating the transmitted torque capacity is a transmitted-torque capacity lower limit of the torque transmitting mechanism, wherein
the setting step sets the value to the joint force so that the transmitted torque capacity is equal to or larger than the transmitted-torque capacity lower limit.

65. The method according to claim 63, further comprising a step of calculating a maximum value of the transmitted torque capacity settable by the torque transmitting mechanism,
wherein the guideline producing step produces the first target operation guideline including the information regulating the transmitted torque capacity of the torque transmitting mechanism so that the transmitted-torque capacity is equal to or less than the maximum value.

66. The method according to claim 65, further comprising a step of acquiring an actually transmitted torque capacity set to the torque transmitting mechanism,
wherein the guideline producing step produces the second target operation guideline on the basis of the actually transmitted torque capacity.

67. The method according to claim 66, wherein the guideline producing step produces the second target operation guideline so that the inputted torque to the torque transmitting mechanism is equal to or less than the actually transmitted torque capacity.

68. The method according to claim 63, further comprising a step of determining whether or not there is an idling of a drive shaft coupled to the friction-joint component,
wherein the maximum torque estimating step, when there is the idling of the drive shaft, raises the maximum torque than a maximum obtained when there is no idling of the drive shaft.

69. The method according to claim 68, wherein the maximum torque estimating step, when there is the idling of the drive shaft, raises the maximum torque as an amount of idling increases.

70. The method according to claim 63, wherein the second target operation guideline includes information indicative of a target value of engine torque, the information being given to the drive force control carried out at the controlling step.

71. The method according to claim 63, wherein the controlling step includes not only calculation of a maximum drive torque and a minimum drive torque which are currently available by the drive source that is under control of the control step but also giving a calculated result to the guideline producing step and
the guideline producing step includes setting of the guidelines on the basis of the calculated result.

72. An apparatus for controlling a joint force of a friction-joint component placed in a torque transmitting mechanism mounted on a vehicle, wherein the apparatus becomes active when the vehicle is running and the friction-joint component receives, as an input torque, a torque generated by a drive source to output the inputted torque, as an outputted torque, from the torque transmitting mechanism, comprising:
calculating means for estimating or detecting an actually transmitted torque capacity set to the torque transmitting mechanism;
guideline producing means for producing both a first target operation guideline directed to the torque transmitting mechanism and a second target operation guideline directed to the drive source, the first target operation guideline including information regulating a transmitted torque capacity of the torque transmitting mechanism, wherein the guideline producing means is configured to produce the second target operation guideline on the basis of the actually transmitted torque capacity;
joint force setting means for setting a value to the joint force depending on the information regulating the transmitted torque capacity;
joint force controlling means for controlling the joint force of the friction-joint component based on the first target operation guideline; and
drive force controlling means for controlling a drive force of the drive source based on the second target operation guideline, the drive force leading to the torque inputted to the friction-joint component.

73. An apparatus for controlling a joint force of a friction-joint component placed in a torque transmitting mechanism mounted on a vehicle, wherein the apparatus becomes active when the vehicle is running and the friction-joint component receives, as an input torque, a torque generated by a drive source to output the inputted torque, as an outputted torque, from the torque transmitting mechanism, comprising:
calculating means for estimating a maximum torque to be applied to the torque transmitting mechanism as the inputted torque;
guideline producing means for producing both a first target operation guideline directed to the torque transmitting mechanism and a second target operation guideline directed to the drive source, the first target operation guideline including information regulating a transmitted torque capacity of the torque transmitting mechanism, wherein the guideline producing means is configured to produce the first target operation guideline indicative of the transmitted torque capacity larger than the maximum torque applied to the torque transmitting mechanism;
joint force setting means for setting a value to the joint force depending on the information regulating the transmitted torque capacity;
joint force controlling means for controlling the joint force of the friction-joint component based on the first target operation guideline; and
drive force controlling means for controlling a drive force of the drive source based on the second target operation guideline, the drive force leading to the torque inputted to the friction-joint component.

74. An apparatus for controlling a joint force of a friction-joint component placed in a torque transmitting mechanism mounted on a vehicle, wherein the apparatus becomes active when the vehicle is running and the friction-joint component receives, as an input torque, a torque generated by a drive source to output the inputted torque, as an outputted torque, from the torque transmitting mechanism, comprising:
guideline producing means for producing both a first target operation guideline directed to the torque transmitting mechanism and a second target operation guideline directed to the drive source, the first target operation guideline including information regulating a transmitted torque capacity of the torque transmitting mechanism;
joint force setting means for setting a value to the joint force depending on the information regulating the transmitted torque capacity;
joint force controlling means for controlling the joint force of the friction-joint component based on the first target operation guideline;
drive force controlling means for controlling a drive force of the drive source based on the second target operation guideline, the drive force leading to the torque inputted to the friction-joint component; and
estimating means for estimating a joint condition of the friction-joint component,
wherein the guide line producing means includes transmitted-torque capacity producing means for producing the transmitted torque capacity given to the torque transmitting mechanism in accordance with a torque applied as the inputted torque to the torque transmitting mechanism and an operated condition of the torque transmitting mechanism and for raising the transmitted torque capacity given to the torque transmitting mechanism in cases where the estimation means estimates that the joint condition of the friction-joint component is improper.

75. A computer-readable program stored in a memory and adapted to be read by a processor, composed of a computer, from the memory, the processor being installed in an apparatus for controlling a joint force of a friction-joint component placed in a torque transmitting mechanism mounted on a vehicle, wherein the apparatus is active when the vehicle is running and the friction-joint component receives, as an input torque, a torque generated by a drive source to output the inputted torque, as an outputted torque, from the torque transmitting mechanism, the program allowing the processor to function as:
calculating means for estimating or detecting an actually transmitted torque capacity set to the torque transmitting mechanism;
guideline producing means for producing both a first target operation guideline directed to the torque transmitting mechanism and a second target operation guideline directed to the drive source, the first target operation guideline including information regulating a transmitted torque capacity of the torque transmitting mechanism, wherein the guideline producing means is configured to produce the second target operation guideline on the basis of the actually transmitted torque capacity;
joint force setting means for setting a value to the joint force depending on the information regulating the transmitted torque capacity;
joint force controlling means for controlling the joint force of the friction-joint component based on the first target operation guideline; and
drive force controlling means for controlling a drive force of the drive source based on the second target operation guideline, the drive force leading to the torque inputted to the friction-joint component.

76. A computer-readable program stored in a memory and adapted to be read by a processor, composed of a computer, from the memory, the processor being installed in an apparatus for controlling a joint force of a friction-joint component placed in a torque transmitting mechanism mounted on a vehicle, wherein the apparatus is active when the vehicle is running and the friction-joint component receives, as an input torque, a torque generated by a drive source to output the inputted torque, as an outputted torque, from the torque transmitting mechanism, the program allowing the processor to function as:

calculating means for estimating a maximum torque to be applied to the torque transmitting mechanism as the inputted torque;

guideline producing means for producing both a first target operation guideline directed to the torque transmitting mechanism and a second target operation guideline directed to the drive source, the first target operation guideline including information regulating a transmitted torque capacity of the torque transmitting mechanism, wherein the guideline producing means is configured to produce the first target operation guideline indicative of the transmitted torque capacity larger than the maximum torque applied to the torque transmitting mechanism;

joint force setting means for setting a value to the joint force depending on the information regulating the transmitted torque capacity;

joint force controlling means for controlling the joint force of the friction-joint component based on the first target operation guideline; and drive force controlling means for controlling a drive force of the drive source based on the second target operation guideline, the drive force leading to the torque inputted to the friction-joint component.

77. A computer-readable program stored in a memory and adapted to be read by a processor, composed of a computer, from the memory, the processor being installed in an apparatus for controlling a joint force of a friction-joint component placed in a torque transmitting mechanism mounted on a vehicle, wherein the apparatus is active when the vehicle is running and the friction-joint component receives, as an input torque, a torque generated by a drive source to output the inputted torque, as an outputted torque, from the torque transmitting mechanism, the program allowing the processor to function as:

guideline producing means for producing both a first target operation guideline directed to the torque transmitting mechanism and a second target operation guideline directed to the drive source, the first target operation guideline including information regulating a transmitted torque capacity of the torque transmitting mechanism;

joint force setting means for setting a value to the joint force depending on the information regulating the transmitted torque capacity;

joint force controlling means for controlling the joint force of the friction-joint component based on the first target operation guideline;

drive force controlling means for controlling a drive force of the drive source based on the second target operation guideline, the drive force leading to the torque inputted to the friction-joint component; and estimating means for estimating a joint condition of the friction-joint component, wherein the guide line producing means includes transmitted-torque capacity producing means for producing the transmitted torque capacity given to the torque transmitting mechanism in accordance with a torque applied as the inputted torque to the torque transmitting mechanism and an operated condition of the torque transmitting mechanism and for raising the transmitted torque capacity given to the torque transmitting mechanism in cases where the estimation means estimates that the joint condition of the friction-joint component is improper.

* * * * *